United States Patent [19]

Haneda et al.

[11] Patent Number: 5,473,440
[45] Date of Patent: Dec. 5, 1995

[54] COLOR IMAGE FORMING APPARATUS WITH DENSITY CONTROL

[75] Inventors: Satoshi Haneda, Hachioji; Yoshiyuki Itihara, Chohu; Takashi Hasebe; Tetsuya Niitsuma, both of Hachioji, all of Japan

[73] Assignee: Konica Corporation, Tokyo, Japan

[21] Appl. No.: 405,307

[22] Filed: Mar. 16, 1995

Related U.S. Application Data

[62] Division of Ser. No. 928,280, Aug. 11, 1992, Pat. No. 5,432,611.

[30] Foreign Application Priority Data

| Aug. 21, 1991 | [JP] | Japan | 3-209530 |
| Sep. 24, 1991 | [JP] | Japan | 3-243379 |
| Oct. 16, 1991 | [JP] | Japan | 3-267837 |
| Nov. 7, 1991 | [JP] | Japan | 3-291543 |
| Dec. 13, 1991 | [JP] | Japan | 3-330737 |

[51] Int. Cl.$^6$ .............................. H04N 1/40; H04N 1/52; G01D 9/42
[52] U.S. Cl. .......................... 358/300; 358/298; 358/534; 347/131
[58] Field of Search .................... 358/300, 296, 358/298, 456, 462, 529, 530, 534, 540; 347/129, 131, 224, 232

[56] References Cited

U.S. PATENT DOCUMENTS

| 4,258,393 | 3/1981 | Ejiri et al. . | |
| 4,667,250 | 5/1987 | Murai . | |
| 4,782,398 | 11/1988 | Mita . | |
| 4,868,684 | 9/1989 | Suzuki | 358/456 X |
| 4,905,023 | 2/1990 | Suzuki . | |
| 4,926,268 | 5/1990 | Kawamura et al. . | |
| 4,984,071 | 1/1991 | Yonezawa . | |
| 5,050,000 | 9/1991 | Ng . | |
| 5,081,528 | 1/1992 | Hayashi et al. . | |
| 5,117,293 | 5/1992 | Asada et al. . | |
| 5,172,132 | 12/1992 | Haneda et al. | 358/296 X |
| 5,253,082 | 10/1993 | Hayashi et al. . | |
| 5,265,196 | 11/1993 | Haneda | 395/109 |
| 5,337,167 | 8/1994 | Hiratsuka et al. | 358/534 X |

FOREIGN PATENT DOCUMENTS

| 0213891 | 3/1987 | European Pat. Off. . |
| 0327107 | 8/1989 | European Pat. Off. . |
| 2386213 | 10/1978 | France . |

*Primary Examiner*—Peter S. Wong
*Assistant Examiner*—Eric Frahm
*Attorney, Agent, or Firm*—Finnegan, Henderson, Farabow, Garrett & Dunner

[57] ABSTRACT

In an apparatus for forming an electrostatic latent image in a form of dot for each pixel on a photoreceptor, each pixel has plural color component signals and a dot is formed for each of color component signals in the same imaging unit area. A signal processing circuit processes specific color component signals of pixels neighboring a target pixel to obtain a density distribution around the target pixel, and determines a recording position of the dot in the recording unit area for each of the plural color component signals on the basis of the density distribution.

7 Claims, 18 Drawing Sheets

FIG. 6(a)

| m1=226 | m2=251 | m3=8 |
|---|---|---|
| m4=200 | m5=45 | m6=7 |
| m7=190 | m8=8 | m9=2 |

| S1=71 | S2=76 | S3=24 |
|---|---|---|
| S4=65 | S5=32 | S6=24 |
| S7=63 | S8=24 | S9=22 |

⁄⁄ : REGION RELATING TO S1
≡ : REGION RELATING TO S2
||| : REGION RELATING TO S3
⟍⟍ : REGION RELATING TO S4

⁄⁄ : REGION RELATING TO S1
≡ : REGION RELATING TO S2
||| : REGION RELATING TO S3
\\ : REGION RELATING TO S4

COLOR IMAGE FORMING APPARATUS WITH DENSITY CONTROL

This is a division of application Ser. No. 07/928,280, filed Aug. 11, 1992, now U.S. Pat. No. 5,432,611.

BACKGROUND OF THE INVENTION

In the present invention, distribution of adjoining pixels is reflected in density distribution of objective recording pixels so that high quality recording can be conducted. The present invention relates to a color image forming apparatus in which: one pixel image data is divided into small pixels m×n (the width×the length) considering the adjoining pixel data, and after that, the center of gravity of each line is found; the phase of the reference wave is deviated according to the center of gravity; and dot recording composed of n small scanning lines is conducted by the modulated signal of the pixel density data modulated by the reference wave signal so that a character and a halftone image can be reproduced. The recording apparatus of the present invention is used for a printing apparatus or a displaying apparatus.

In the field of image forming apparatus using an electrophotographic method, a digital halftone image is reproduced in the following manner: an image signal of an original image is read by a scanner; and image density data in which the image signal is gradation-corrected, A/D converted, and shading-corrected, is modulated by a reference signal.

When an original image is read by the scanner, an edge portion of the image is read as halftone density due to the aperture of a solid state image pick-up element installed in the scanner. When a latent image is formed on a photoreceptor with the image density data obtained from the image signal, the image is recorded averagely in a recording pixel corresponding to the edge portion of the latent image in the case where the image density is intermediate, and thereby dot breakage is generated, and as a result, sharpness of the recorded image is lowered. Conventionally, it is widely known that MTF correction for sharpening the image can be conducted by a differential filter, a Laplacian filter, or the like in order to maintain the sharpness of the image. However, this emphasizes only the edge portion of the image, so that uniformity of the halftone image is relatively lowered.

On the other hand, even when an interpolated character or figure is formed from computer graphic (C.G.) data or font data, a similar problem is caused. That is, when the edge portion is interpolated smoothly by the intermediate density of the interpolation data, a recording pixel corresponding to the edge portion is recorded in pixels as average density, and thereby the resolution of the recorded image is lowered.

SUMMARY OF THE INVENTION

For the reasons mentioned above, intermediate density processing, which effectively operates on the edge portion of the image, is required.

Further, when intermediate density processing is conducted on each color in a color image forming apparatus, there occurs the problem in which color tone is varied, or characters become not sharp.

In view of the foregoing problems, an object of the present invention is to provide an image forming apparatus in which resolution of the image, which is formed from scanner data, C.G data, font data, or the like, is improved, and high quality recording is conducted.

The above described object is accomplished by a color image forming apparatus in which high density pixel recording is conducted according to the density data of a small pixel in the objective pixel which is determined corresponding to density data of the pixel adjoining the objective pixel, and the color image forming apparatus is characterized in that: when recording position of each color is modulated according to density distribution of the objective pixel and the adjoining pixel, the recording position of each color is determined according to density distribution of the pixel adjoining the specific color.

A preferable embodiment is a color image forming apparatus which is characterized in that: the specific color is green.

The aforementioned object is accomplished by an color image forming apparatus in which high density pixel recording is conducted according to density data of a small pixel in the objective pixel determined corresponding to density data of the pixel adjoining the objective pixel, which is characterized in that: when a recording position of each color is modulated according to density distribution of the objective pixel and the adjoining pixel, the recording position of each color is determined corresponding to density distribution of the adjoining pixel in the case where density of the objective pixel is not less than a predetermined density.

The aforementioned object is accomplished by a color image forming apparatus in which high density pixel recording is conducted according to density data of a small pixel in the objective pixel which is determined corresponding to density data of the pixel adjoining the objective pixel, and which is characterized in that: the apparatus is provided with means to image-discriminate the objective pixel; and means in which only the achromatic component is recording-position-modulated according to density distribution of the adjoining pixel when the objective pixel is discriminated to be in the halftone region by the image discrimination, and entire color components are recording-position-modulated when the pixel is discriminated to be in a character region.

The aforementioned object is accomplished by a color image forming apparatus in which high density pixel recording is conducted according to density data of a small pixel in the objective pixel which is determined corresponding to density data of the pixel adjoining the objective pixel, and which is characterized in that: a recording position of each color is determined according to density distribution of the pixel adjoining the objective pixel when the recording position of each color is modulated in the primary scanning direction and the subsidiary scanning direction according to the density of the objective pixel and density distribution of the adjoining pixel.

The aforementioned object is accomplished by a color image forming apparatus in which high density pixel recording is conducted according to density data of a small pixel in the objective pixel which is determined corresponding to density data of the pixel adjoining the objective pixel, and which is characterized in that: a recording position of each color is determined according to density distribution of the pixel adjoining the objective pixel when the recording position of each color is modulated in the primary scanning direction and the subsidiary scanning direction according to the density of the objective pixel and density distribution of the adjoining pixel. In this image formation, when a period of the reference wave can be variable corresponding to the image, preferable resolution and gradation can be realized corresponding to the image. Further, the object of the present invention is accomplished by an image forming apparatus which is characterized in that: the apparatus is provided with means to image-discriminate the objective pixel; and means by which the recording position modulation is conducted according to the density distribution of the adjoining pixel using a reference wave having a long period, when the pixel is discriminated to be in the halftone region, and the recording position modulation is conducted by a reference wave having a short period, when the pixel is discriminated to be in the character region.

BRIEF DESCRIPTION OF THE DRAWINGS

FIGS. 6(a) and 6(b) are views showing an example in the case where an objective pixel for RE processing is divided into 3×3, and P= 0.5.

FIGS. 12(a)–10(d) are timing charts showing a signal of each portion of the modulation signal generating circuit of the example in FIG. 1 in the case where the objective pixel exists in the halftone region.

DETAILED DESCRIPTION OF THE PREFERRED EMBODIMENT

Figure 4:
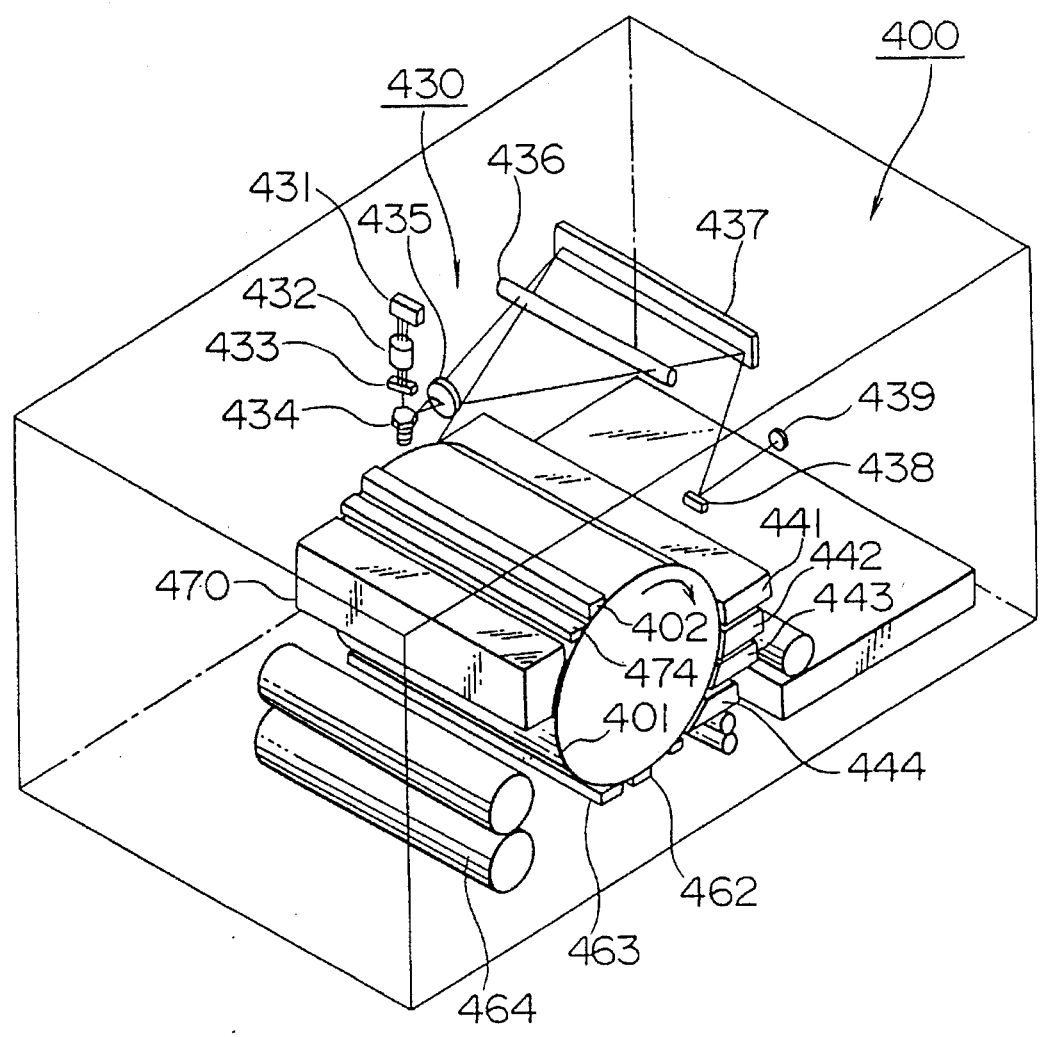
FIG. 4 is a perspective view showing a general structure of the image forming apparatus of the present invention.

The structure of an image forming apparatus 400 which is an example of the present invention, will be described as follows. FIG. 4 is a perspective view showing the outline of the structure of the image forming apparatus of the present embodiment.

An image forming apparatus 400 has the following functions in which: the photoreceptor is uniformly charged; after that, a dot-like electrostatic latent image is formed by a spot light which is pulse-width-modulated or intensity-modulated according to a modulation signal obtained by binarizing an analog image density signal which is obtained by D/A converting digital image density data obtained from a computer or a scanner, and a reference wave signal after they are compared with each other, or by differentially amplifying them; a dot-like toner image is formed by reversal development of the latent image; charging, exposing, and developing are repeatedly conducted so that a color toner image can be formed on the photoreceptor; the color toner image is transferred onto a recording sheet; the recording sheet is separated from the photoreceptor; and then the image is fixed so that the color image can be obtained.

The image forming apparatus 400 is composed of: a photoreceptor which is a drum-like image forming body 401 rotated in the arrowed direction (hereinafter, it will be called simply a photoreceptor); a scorotron charger 402 by which the surface of the photoreceptor 401 is uniformly charged; an optical scanning system 430; developing units 441 to 444 in which yellow, magenta, cyan, and black toners are loaded; a transfer unit 462 composed of a scorotron charger; a separator 463; a fixing roller 464; a separator 463; a cleaning unit 470; a discharger 474; and the like.

Figure 14:
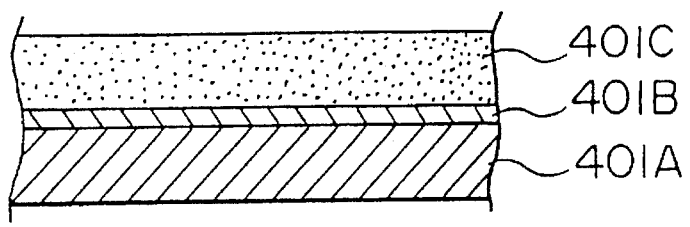
FIG. 14 is a sectional view showing an example of a specific structure of the high $\gamma$ photoreceptor used for the present embodiment.

The photoreceptor 401 used in the present embodiment has a high $\gamma$ characteristic and FIG. 14 shows an example of its specific structure.

The photoreceptor 401 is formed by a conductive support 401A, an intermediate layer 401B, and a photosensitive layer 401C, as shown in FIG. 14. Thickness of the photosensitive layer 401C is about 5 to 100 µm, and preferably 10 to 50 µm. The photoreceptor 401 is structured in the following manner: a drum-like conductive support 401A, which is made of aluminum and has a diameter of 150 mm, is used for the photoreceptor; the intermediate layer 401B, which is made of ethylene-acetic acid vinyl copolymer and whose thickness is 0.1 µm, is formed on the conductive support 401A; and the photosensitive layer 401C, whose thickness of a film is 35 µm, is provided on the intermediate layer 401B.

As the conductive support 401A, a drum, which is made of aluminum, steel, copper, or the like, and has a diameter of about 150 mm, is used, however, a belt-like body in which a metal layer is laminated or vapor-deposited on a paper or a plastic film, or a metallic belt such as a nickel belt, which is made by the method of electroforming, may be used as the conductive support. The intermediate layer 401B is preferably provided with the following properties: it can resist high charging voltage of ±500V to ±2000V; for example, in the case of positive charging, injection of electrons from the conductive support 401A can be prevented; and hole mobility can be provided so that superior light decay characteristics due to an avalanche phenomenon can be obtained. For the aforementioned reasons, positive charging type electric charge conveyance material, for example, disclosed in Japanese Patent Application No. 188975/1986 which has been proposed by the inventors of the present invention, is preferably added by not more than 10 weight % to the intermediate layer 401B.

As the intermediate layer 401B, the following resins, for example, which are commonly used for a photosensitive layer of electrophotography, can be used.

(1) vinyl polymer such as polyvinyl alcohol (Poval), polyvinyl methyl ether, and polyvinyl ethyl ether, (2) nitrogen vinyl polymer such as polyvinylamine, poly-N-vinyl imidazole, polyvinyl pyridine (quarternary salt), polyvinyl pyrrolidone, and vinyl pyrrolidone-vinyl acetate copolymer, (3) polyether polymer such as polyethylene oxide, polyethylene glycol, and polypropylene glycol, (4) acrylic acid polymer such as polyacrylic acid and its salt, polyacrylamide, poly-$\beta$-hydroxy ethylacrylate, (5) methacrylate polymer such as polymethacrylate and its salt, polymethacrylamide, and polyhydroxy propyl methacrylate, (6) ether cellulose polymer such as methyl cellulose, ethyl cellulose, carboxy methyl cellulose, hydroxy ethyl cellulose, and hydroxy propyl methyl cellulose, (7) polyethylene imine polymer such as polyethylene imine, (8) polyamino acid such as polyalanine, polyserine, poly-L-glutamine acid, poly-(hydroxy ethyl)-L-glutamine, poly-$\delta$-carboxy methyl-L-cysteine, polyproline, lysine-tyrosine copolymer, glutamic acid-lysine-alanine copolymer, silk fibroin, and casein, (9) starch and its derivatives such as starch acetate, hydroxyl ethyl starch, starch acetate, hydroxy ethyl starch, amine starch, and phosphate starch,

(10) polymer which is soluble in mixed solvent of water and alcohol, such as soluble nylon, and methoxy methyl nylon (8 type nylon) which are polyamide.

The electric charge conveyance material is not used for the photosensitive layer 401C basically, and the photosensitive layer 401C is formed by the following manner: phthalocyanine minute particles, which are made of photoconductive pigment and whose diameter is 0.1 to 1 $\mu$m, antioxidant and binder resin are mixed and dispersed by using a solvent for the binder resin so that a coating liquid is prepared; the coating liquid is coated on the intermediate layer; and it is dried and thermally processed.

When the photoconductive material is used with the electric charge conveyance material, the photosensitive layer is structured in the following manner: the photoconductive material which is composed of the photoconductive pigment and a small amount of the electric charge conveyance material whose weight % is not more than 1/5, and preferably 1/1000 to 1/110 (weight ratio) of the photoconductive pigment, and the antioxidant are dispersed into the binder resin. When a high $\gamma$ photoreceptor is used, a sharp latent image can be formed although the diameter of the laser beam is spread, and thereby recording can be effectively conducted with high resolution.

In the present example, since color toner images are superimposed on the photoreceptor 401, the photoreceptor, which has spectral sensitivity on the infrared side, and a laser diode, which emits an infrared ray, are used so that a laser beam emitted from the optical scanning system 430 is not shaded by the color toner images.

Next, light decay characteristics of the high $\gamma$ photoreceptor used in the present example, will be explained as follows.

Figure 13:
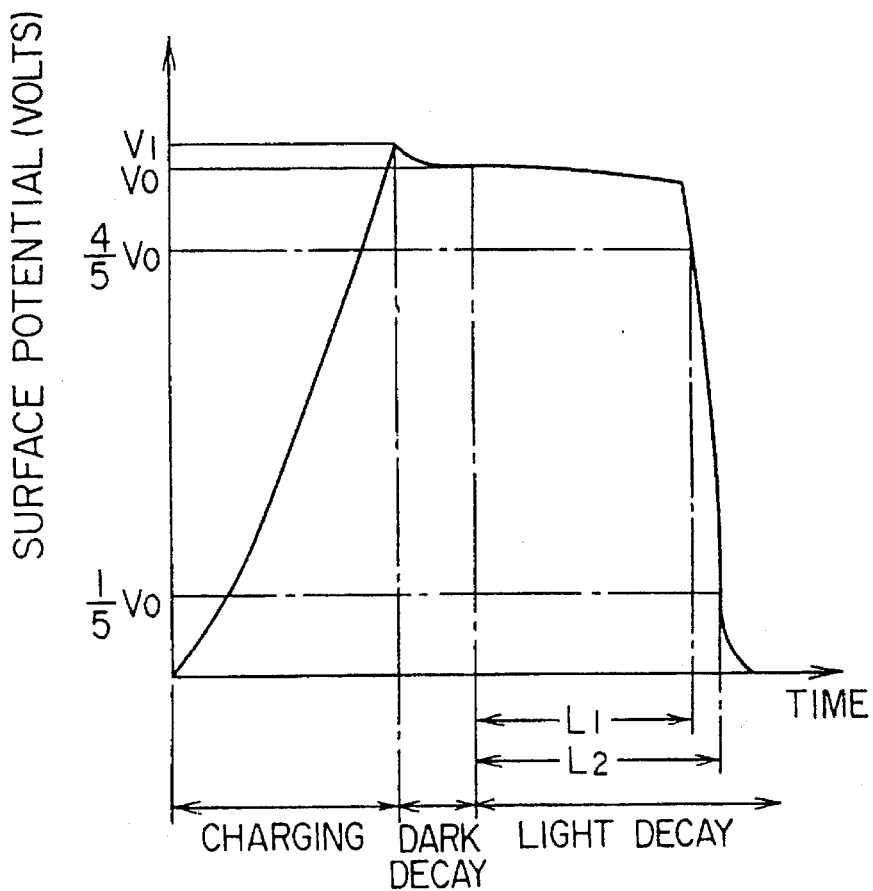
FIG. 13 is a graph showing characteristics of a high $\gamma$ photoreceptor used for the present embodiment.

FIG. 13 is a graph showing characteristics of the high $\gamma$ photoreceptor. In the drawing, $V_1$ is a charging potential (V), $V_0$ is an initial potential (V) before exposure, $L_1$ is an amount of irradiation ($\mu$J/cm$^2$) of a laser beam which is necessary when the initial potential $V_0$ is decayed to 4/5, and $L_2$ is an amount of irradiation ($\mu$J/cm$^2$) of a laser beam which is necessary when the initial potential $V_0$ is decayed to 1/5.

A preferable range of $L_2/L_1$ is $$1.0 < L_2/L_1 \leq 1.5$$

In the example, $V_1$=1000 (V), $V_0$=950 (V), $L_2/L_1$=1.2, and the photoreceptor potential of the exposure section is 10 V.

When light sensitivity in the position corresponding to a middle period of exposure at which the initial potential ($V_0$) is decayed to 1/2 in the light decay curve is defined as E1/2, and that in the position corresponding to an initial period of the exposure at which the initial potential ($V_0$) is decayed to 9/10 is defined as E9/10, a photoconductive semiconductor which gives the following relations is selected.

$$(E½)/(E9/10) \geq 2$$

and preferably, $$(E½)/(E9/10) \geq 5$$

In the aforementioned, the light sensitivity is defined as the absolute value of an amount of potential lowering to a minute amount of exposure.

In the light decay curve of the photoreceptor 401, the absolute value of the differential factor of the potential characteristics, which means the light sensitivity, is small, as shown in FIG. 13, at the time of a small amount of light, and it sharply increases when an amount of light increases. Specifically, the light decay curve shows the following characteristics: it shows almost horizontal light decay characteristics because sensitivity characteristics are not good for a small period of time at the initial period $L_1$ of exposure, as shown in FIG. 13; however, it shows a super high $\gamma$ characteristic which become lower almost linearly because it has super high sensitivity, ranging from the middle period of exposure to the latter period thereof. It is considered that the photoreceptor 401 has high $\gamma$ characteristics, making use of the avalanche phenomena under the high charging voltage of, specifically, +500 to +2000V. That is, it is considered that carriers generated on the surface of photoconductive pigment at the initial period of exposure are effectively trapped by an interface layer of the pigment and coating resin so that the light decay is positively prevented, and thereby extremely sudden avalanche phenomena are generated after the middle period of exposure.

Next, a color image forming apparatus according to the present invention will be explained as follows. In the color image forming apparatus, an objective pixel of the image density data is formed by small pixels m×n (width×length), and a distribution of the density data of adjoining pixels including the objective pixel, is replaced with the distribution of small pixels m×n in one pixel, and the image is formed by the following method: a position in which dots of n rows are written, is displaced when a phase of a reference wave in each row of small pixels is displaced according to image density data of small pixels obtained by distributing data of the objective pixel multiplied by constant P corresponding to the distribution. Displacement of the position in which dots are written will be referred to as recording position modulation, hereinafter. Further, processing to convert the image density data of the objective pixel into the image density data of small pixels obtained by dividing the objective pixel into m×n, will be referred to as resolution improving processing (RE processing), hereinafter. Due to RE processing, high density recording can be conducted. In this case, a high γ photoreceptor is specifically effective in order to form a latent image corresponding exactly to the reference wave.

In this invention, RE processing is conducted when ① the image density data of the objective pixel is not less than a first threshold value, that is, not less than the specific density, namely the first threshold value. In an area corresponding to a highlight portion, in many cases, RE processing is not conducted on a background portion of a document, and small pixels m×n are caused to have a uniform density. In the case of CRT, this data display can be conducted.

However, in the case of laser recording which will be described later, it is difficult to display the data uniformly, and therefore, a reference wave whose density center exists in the center of the image density, is selected. Due to the aforementioned, uniformity in the highlight portion can be kept, and a noisy image can be prevented from occurring.

② In the case of high density, and a steep density gradient, when a reference wave whose density recording position does not exist in the center is selected, dots are formed in the manner that they overlap with the adjoining pixel.

In order to prevent a density change and recording dot blocking between pixels, when the image density data of the objective pixel is not less than a specific second threshold value, in a high density portion also, a reference wave whose density center exists in the center of the image density, is selected.

Since a uniform display can be conducted in the case of CRT, the densities of small pixels m×n are processed as a uniform density. That is, RE processing is not conducted.

In a color image forming apparatus in which high density image recording is conducted according to density distribution data in the objective pixel which is determined corresponding to density data of the pixel adjoining the objective pixel, a color image forming apparatus characterized in that: when a specific density data of the objective pixel is not less than the first threshold value, recording position modulation is conducted according to the determined density distribution, is preferable, or the apparatus characterized in that; when a specific density data of the pixel is not more than the second threshold value, recording position modulation is conducted according to the determined density distribution, is preferable.

Figures 5A, 5B:
FIGS. 5(a) and 5(b) are views for explaining RE processing used for determination of phases of reference waves.

FIG. 5(a) is a plan view in which the adjoining pixels including the objective or target pixel m5 are expressed as m1 to m9 when the objective pixel is defined as m5, and the objective pixel m5 is divided into 3×3 small pixels or image dots. FIG. 5(b) is an enlarged view in which each small pixel is expressed by s1 to s9 when the objective pixel is divided into small pixels 3× 3. m1 to m9 and s1 to s9 also express the density of each portion.

RE processing will be explained in detail as follows. Taking the example of the case where the objective pixel m5 is divided into 3×3 small pixels, density of a small pixel si is determined by the following equation.

$$si = (9 \times m5 \times P \times mi/A) + (1-P) \times m5$$

Where i=1, 2, . . . , 9, and P is a constant, which is called the strength for RE processing, and in which the range of 0.1 to 0.9 is used, A is the sum total of m1 to m9.

In the above equation, the term (9×m5×P×mi/A) expresses a density in which the density of the objective pixel m5 multiplied by P is distributed to each pixel according to the density ratio of the adjoining pixels, and the term (1-P)×m5 expresses a density in which the residual density of the objective pixel m5 is distributed equally to each small pixel, so that an element of unsharpness is taken into the equation.

FIG. 6 is an illustration showing an example in which the objective pixel m5 is divided into 3×3 small pixels, and P=0.5. FIG. 6(a) is an illustration showing an example of the density distribution of the adjoining pixels including the objective pixel m5. FIG. 6(b) is an illustration showing the density distribution in the objective pixel m5 which is calculated by P=0.5.

Figure 7A:
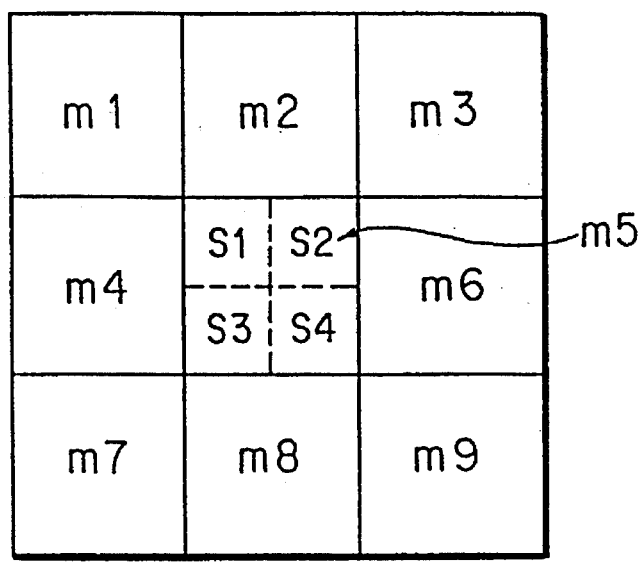
FIGS. 7(a) and 7(b) are views showing an example in the case where the objective pixel is divided into 2×2.
Figure 7B:
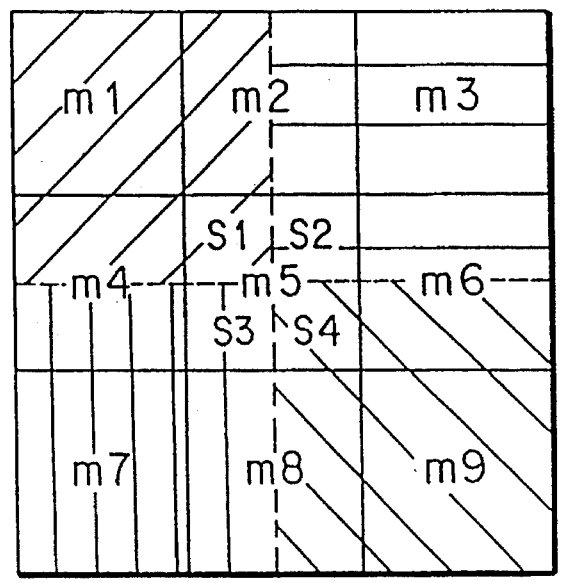
Figure 8A:
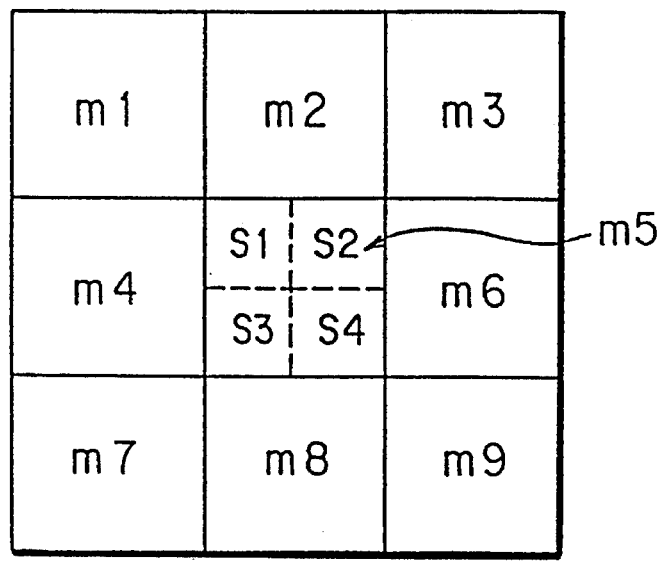
FIGS. 8(a) and 8(b) are views showing another example in the case where the objective pixel for RE processing is divided into 2× 2.

FIG. 7 and FIG. 8 show an example in which the objective pixel m5 is divided into 2×2 small pixels.

FIG. 7(a) is an illustration showing an example in which the objective pixel m5 is divided into 2×2 small pixels. FIG. 7(b) is an illustration showing an example of the adjoining pixels relating to small pixels s1 to s4 in the objective pixel.

Density of s1, s2, s3, and s4 is calculated according to Equation 1.

$$s1 = \frac{4m1 + 2(m2 + m4) + m5}{A} \times m5 \times P + (1-P) \times m5 \quad \text{(Equation 1)}$$

$$s2 = \frac{4m3 + 2(m2 + m6) + m5}{A} \times m5 \times P + (1-P) \times m5$$

$$s3 = \frac{4m7 + 2(m4 + m8) + m5}{A} \times m5 \times P + (1-P) \times m5$$

$$s4 = \frac{4m9 + 2(m6 + m8) + m5}{A} \times m5 \times P + (1-P) \times m5$$

where A is the total sum of m1 to m9.

Figure 8B:
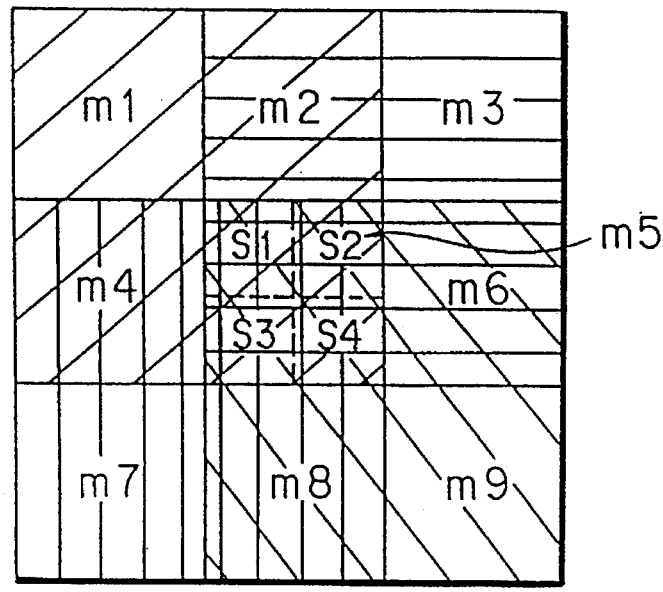

FIG. 8 (a) is an illustration showing another example in which the objective pixel m5 is divided into 2×2 small pixels. FIG. 8(b) is an illustration showing another example of the adjoining pixels relating to small pixels s1 to s4 in the objective pixel. Density calculation of s1, s2, s3, and s4 is conducted according to Equation 2.

$$s1 = \frac{m1 + m2 + m4 + m5}{A} \times \frac{9}{4} \times m5 \times P + (1-P) \times m5 \quad \text{(Equation 2)}$$

$$s2 = \frac{m2 + m3 + m5 + m6}{A} \times \frac{9}{4} \times m5 \times P + (1-P) \times m5$$

$$s3 = \frac{m4 + m5 + m7 + m8}{A} \times \frac{9}{4} \times m5 \times P + (1-P) \times m5$$

$$s4 = \frac{m5 + m6 + m8 + m9}{A} \times \frac{9}{4} \times m5 \times P + (1-P) \times m5$$

where A is the total sum of m1 to m9.

Figure 1:
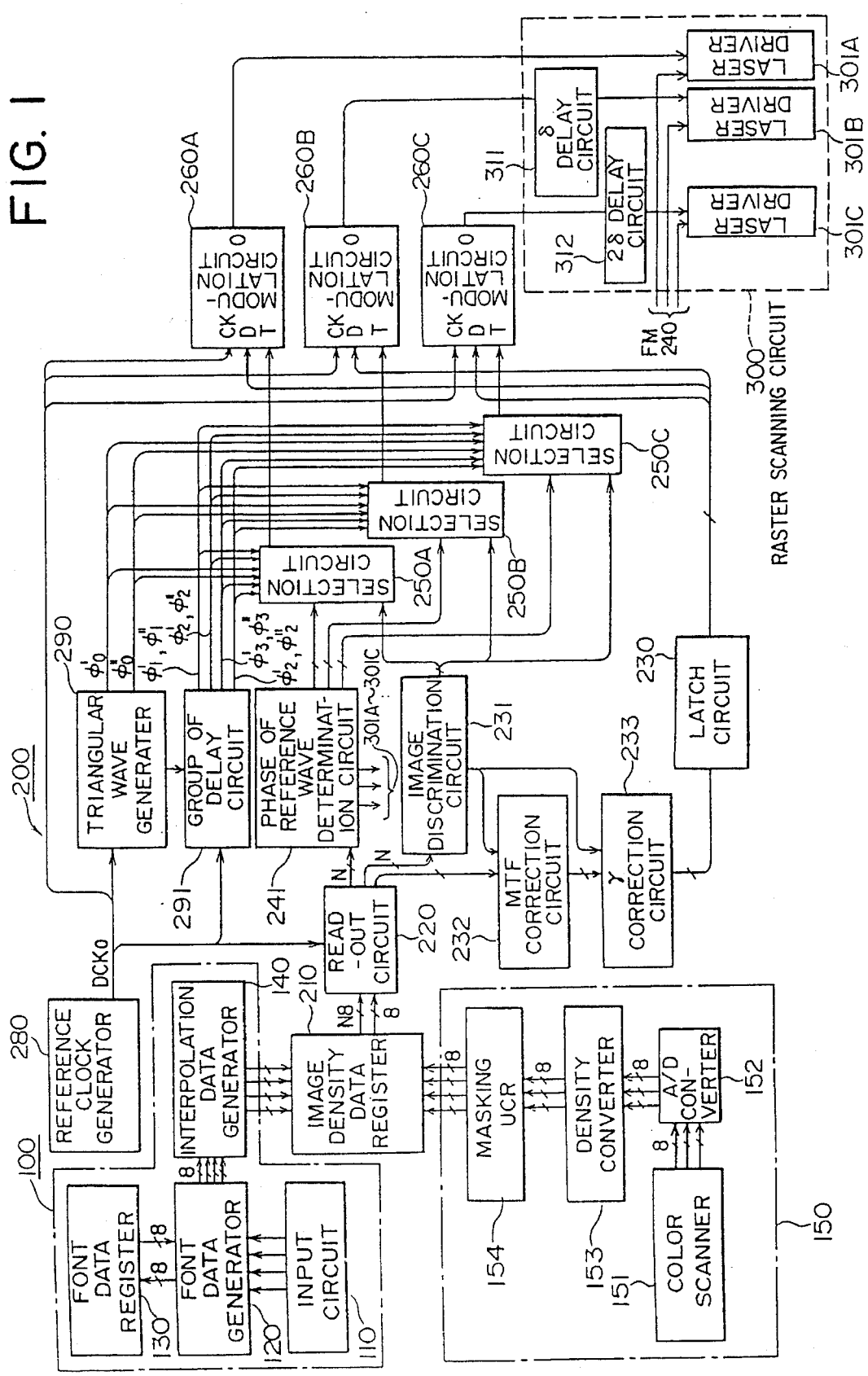
FIG. 1 is a block diagram of an image processing circuit of an example of the image forming apparatus of the present invention.
Figure 2:
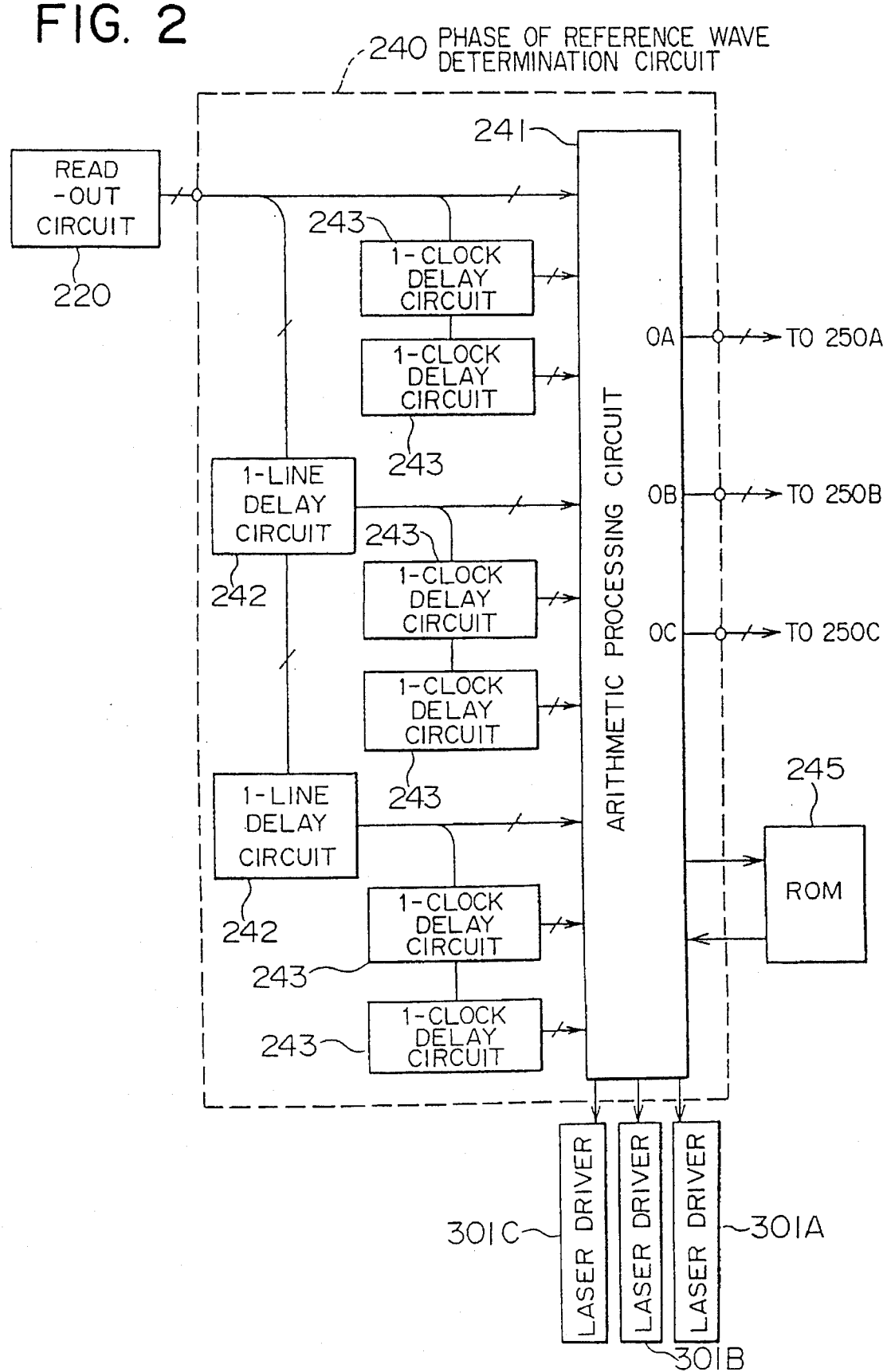
FIG. 2 is a block diagram showing an example of a phase of reference wave determination circuit in FIG. 1.
Figure 3:
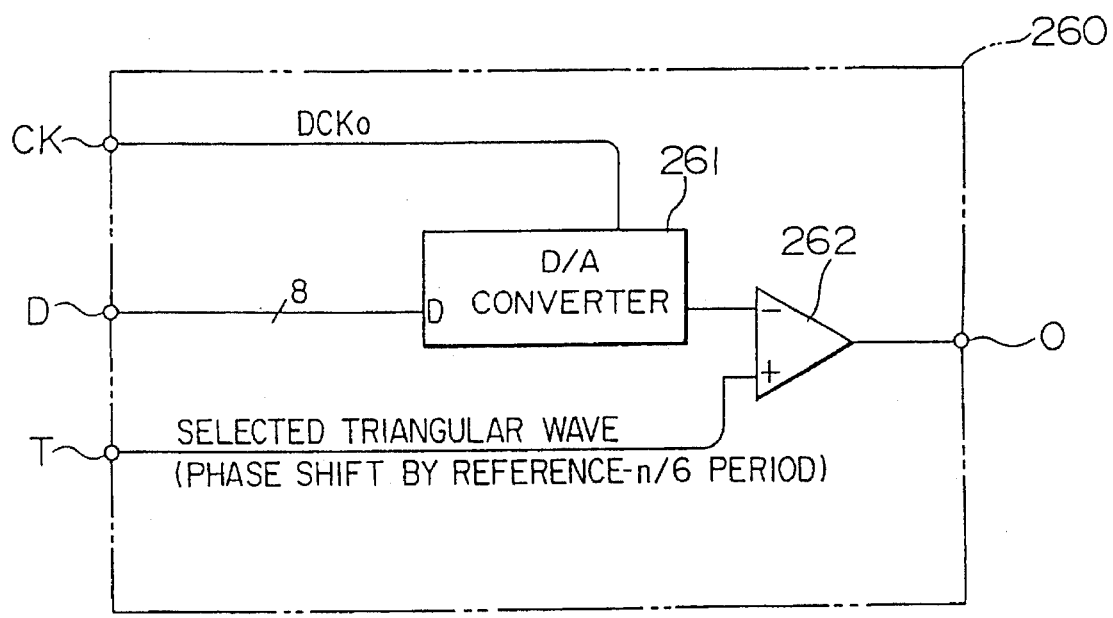
FIG. 3 is a block diagram showing an example of a modulation circuit in FIG. 1.

FIG. 1 is a block diagram showing an example of an image processing circuit which is used for a color image forming apparatus of the present invention (an example in which the objective pixel is divided into 3×3). FIG. 2 is a block diagram showing a phase of reference wave determination circuit of the present embodiment, and FIG. 3 is a block diagram showing a modulation circuit of the present embodiment.

An image processing circuit 1000 of the present embodiment, is a circuit which structures a driving circuit of an optical scanning system, and is composed of an image data processing circuit 100, a modulation signal generator 200 and a raster scanning circuit 300.

The image data processing circuit 100 is a circuit which interpolates an edge portion of font data and outputs it, and is composed of an input circuit 110 including a computer, a font data generator 120, a font data resister 130, and an interpolation data generator 140, and sends a character code signal from the input circuit 110, a size code signal, a position code signal and a color code signal to a font data generator 120. The font data generator 120 selects an address signal from four kinds of input signals and sends it to the font data register 130. The font data register 130 sends outline font data corresponding to one character which corresponds to an address signal to the font data generator 120. The font data generator 120 sends the outline font data to the interpolation data generator 140. The interpolation data generator 140 interpolates indentation or jumping of the image density data, which is generated at the edge portion of the outline font data by conventional binary development, into 8 bit image data using intermediate density, and sends it to an image density data register 210 which is composed of a frame memory. Concerning the generated color, corresponding colors are converted into density data of yellow (Y), magenta (M), cyan (C), and black (B) corresponding to a color code. Due to the aforementioned, a font is bit-map-developed in each frame memory under the condition that each color has the same shape, and the ratio of density is different.

The modulation signal generator 200 is structured by the image density data register 210, a read-out circuit 220, a latch circuit 230, an image discrimination circuit 231, an MTF correction circuit 232, a γ correction circuit 233, a phase of reference wave determination circuit 240, selection circuits 250A to 250C, modulation circuits 260A to 260C, a reference clock generator 280, a triangular wave generator 290, a group of delay circuits 291, and the like.

The image density data register 210 is an ordinary page memory (hereinafter, it will be referred to as a page memory), and a RAM (random access memory) which stores data by every one page, and has a capacity which can store multi-value image density data corresponding to at least one page (1 image plane). When it is accepted for a color printer, the printer is provided with a page memory which can store an image density signal corresponding to each color component of a plurality of colors, for example, yellow, magenta, cyan, and black.

The read-out circuit 220 reads out continuous image density data of every one scanning line, which is continued in synchronization with the reference clock $DCK_0$, from the image density data register (page memory) 210, and sends it to the the phase of reference wave determination circuit 240, the image discrimination circuit 231, and MTF correction circuit 232, wherein an index signal is used as a trigger.

The latch circuit 230 is a circuit which latches the image density data during processing in the phase of reference wave determination circuit is conducted.

The reference clock generator 280 is a pulse generating circuit, and generates the reference clock $DCK_0$ which is a pulse signal with a cycle period, which is the same as the pixel clock, and sends it to the read-out circuit 220, the triangular wave generator 290, the delay circuit 291, and modulation circuits 260A to 260C. For the convenience sake, the clock is referred to as reference clock $DCK_0$.

Waveform shaping of a reference triangular wave $\phi_0'$ which is a reference wave with the same period as that of the pixel clock, and a triangular wave $\phi_0''$ which is a reference wave whose period is twice as long as that of the reference triangular wave, is conducted in the triangular wave generator 290 according to the reference clock $DCK_0$. Further, in the group of delay circuits 291, a plurality of clocks $DCK_1'$ to $DCK_4'$ and $DCK_1''$ to $DCK_4''$ which have a phase difference of a constant period respectively, (in this example, $\frac{1}{6}$ period each), with respect to the reference clock $DCK_0$ and a clock whose period is twice as long as that of the reference clock, are generated, and according to the aforementioned, triangular waves $\phi_1'$ to $\phi_4'$ and $\phi_1''$ to $\phi_4''$ which are reference waves having different period (in this case, triangular waves $\phi_1'$ and $\phi_1''$ whose periods are advanced by a $\frac{1}{6}$ period from the reference triangular wave, triangular waves $\phi_2'$ and $\phi_2''$ whose periods are advanced by a $\frac{2}{6}$ period, triangular waves $\phi_3'$ and $\phi_3''$ whose periods are delayed by a $\frac{1}{6}$ period, and triangular waves $\phi_4'$ and $\phi_4''$ whose periods are delayed by a $\frac{2}{6}$ period), are outputted.

The selection circuits 250A to 250C are provided with input portions for the reference triangular waves $\phi_0'$, $\phi_0''$ and triangular waves $\phi_1'$ to $\phi_4'$ and $\phi_1''$ to $\phi_0''$ whose phases are shifted, and select one of the triangular waves by the selection signal from the phase of reference wave determination circuit 240 which will be described later, and send it to input terminal T of the modulation circuits 260A to 260C.

The modulation circuits 260A to 260C are structured with the same circuit as each other as shown in FIG. 3, and are composed of a D/A converter 261, a comparator 262, and input section T of the triangular waves which are the reference triangular wave $\phi_0'$ and the triangular waves whose periods are shifted by a $\frac{1}{6}$ period respectively from the reference triangular wave, and the triangular wave $\phi_0''$ whose period is twice as long as that of the reference triangular wave, and the triangular waves whose periods are shifted by $\frac{1}{6}$ period respectively from the triangular wave $\phi_0''$, and the image density data inputted through the latch circuit 230 is D/A converted by the D/A converter 261 in synchronization with the reference clock $DCK_0$, and the triangular waves inputted from the selection circuit 250A to 250C are compared with the image density data as reference waves so that the pulse width modulation signal can be obtained.

The reference wave is selected from the triangular waves $\phi_0'$ to $\phi_4'$ with respect to the character region, and $\phi_0''$ to $\phi_4''$ with respect to the halftone region, by the image discrimination circuit 231.

As shown in FIG. 2, the phase of reference wave determination circuit 240 is composed of a one line delay circuit 242, a one clock delay circuit 243, and an arithmetic processing circuit 241. The one line delay circuit operates as follows: the image density data of the first one scanning line of three scanning lines of the image density data in which one scanning line is sent at a time, is delayed for two line scanning times by the one line delay circuit 242: the image density data of the second one scanning line is delayed for one line scanning time by the circuit 242; and the image density data of the last one scanning line is not delayed. Further, each image density data is delayed for the time of two reference clocks or one reference clock by the one clock delay circuit 243, and all image density data of the pixels, which include the objective pixel and adjoin the pixel, are sent at the same time to the arithmetic processing circuit 241.

In the arithmetic processing circuit 241, the image density data of the small pixel is obtained by the RE processing. At first, the density distribution in one pixel is obtained by the following method.

The image density data of the obtained small pixel is divided into a small scanning line including s1, s2, s3 . . . , the small scanning line including s4, s5, s6 . . . , and the small scanning line including s7, s8, s9 . . . , as shown in FIG. 5, and one scanning line of the original pixel corresponds to these three scanning lines of the small pixels.

Figure 9:
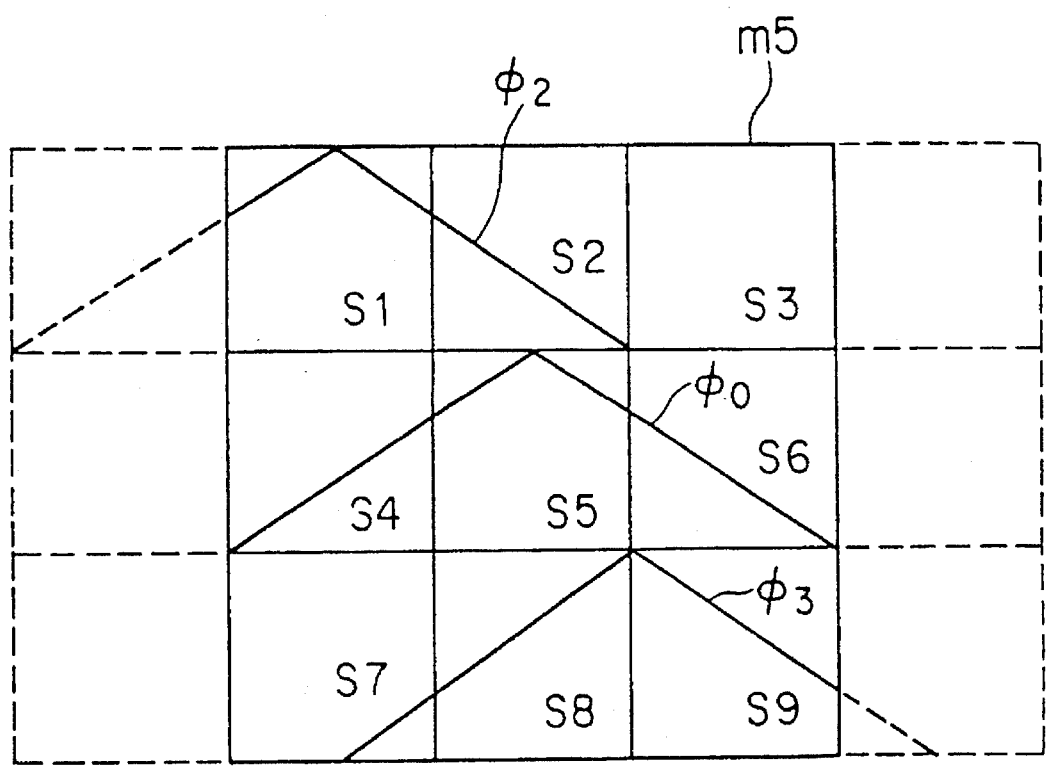
FIG. 9 is a view for explaining phase deviation of the reference wave in the case where the objective pixel exists in the character region.

The arithmetic processing circuit 241 calculates average density of each small scanning line and the position of the gravity center of the density data in the original one pixel including each small scanning line, and outputs the average density data to emission output terminals of laser drivers 301A to 301C, and outputs the selection signals which are different as follows and selected from the position data of the gravity center, to selection circuits 250A to 250C from the output terminals OA to OC. That is, the arithmetic processing circuit 241 outputs the following signals from the output terminal OA to the selection circuit 250A: a signal which selects the reference triangular wave $\phi_0'$ whose phase is not-shifted when the gravity center of s1, s2, and s3 (the first small scanning line) of the pixel m5 is positioned in the vicinity of the center of s2; a signal which selects the triangular wave $\phi_1'$ whose phase is advanced by a ⅙ period when the gravity center is positioned in the vicinity of the border between s2 and s1; the signal which selects the triangular wave $\phi_2'$ whose phase is advanced by a ⅖ period when the gravity center is positioned in the vicinity of the center of s1; the signal which selects the triangular wave $\phi_3'$ whose phase is delayed by a ⅙ period when the gravity center is positioned in the vicinity of the border between s2 and s3; and the signal which selects the triangular wave $\phi_4'$ whose phase is delayed by a ⅖ period when the gravity center is positioned in the vicinity of the center of s3. In the same manner, from the output terminal OB, the triangular wave selection signal of the second small scanning line which is determined by the position of the gravity center of density of s4, s5, and s6 of the pixel m5 (in this case, a central small scanning line) is outputted to the selection circuit 250B, and from the output terminal OC, the triangular wave selection signal of the third small scanning line which is determined by the position of the gravity center of density of s7, s8, and s9 of the pixel m5, is outputted to the selection circuit 250C. FIG. 9 is an illustration showing an example of the relation between the triangular waves whose phases are different, and the objective pixel.

Figure 17:
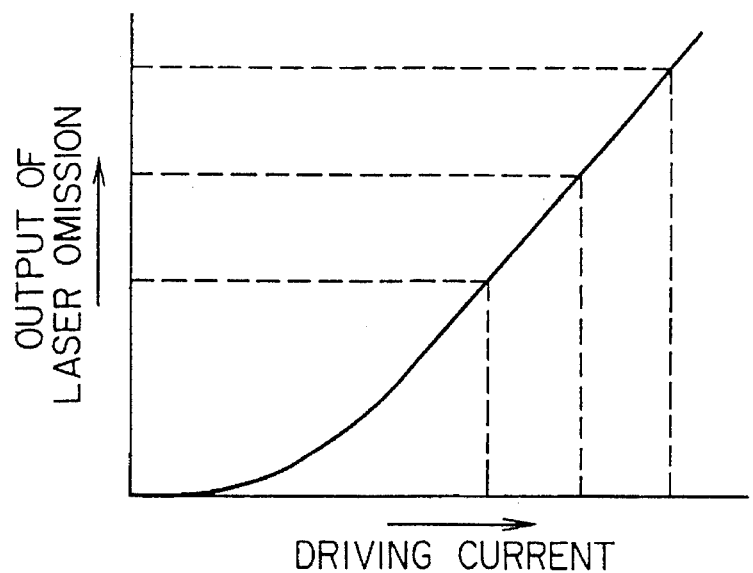
FIG. 17 is a graph showing the relation between a driving current and an emitted output of the semiconductor laser.

The arithmetic processing circuit 241 controls an emission output of laser drivers 301A to 301C corresponding to the average density in the pixel m5 of each small scanning line. For example, the circuit 241 controls a semiconductor laser 301A to emit the beam in proportion to the average density of s1, s2 and s3. FIG. 17 is a graph showing an example of the relation between a driving current of the semiconductor laser and the output of laser emission.

Figure 11:
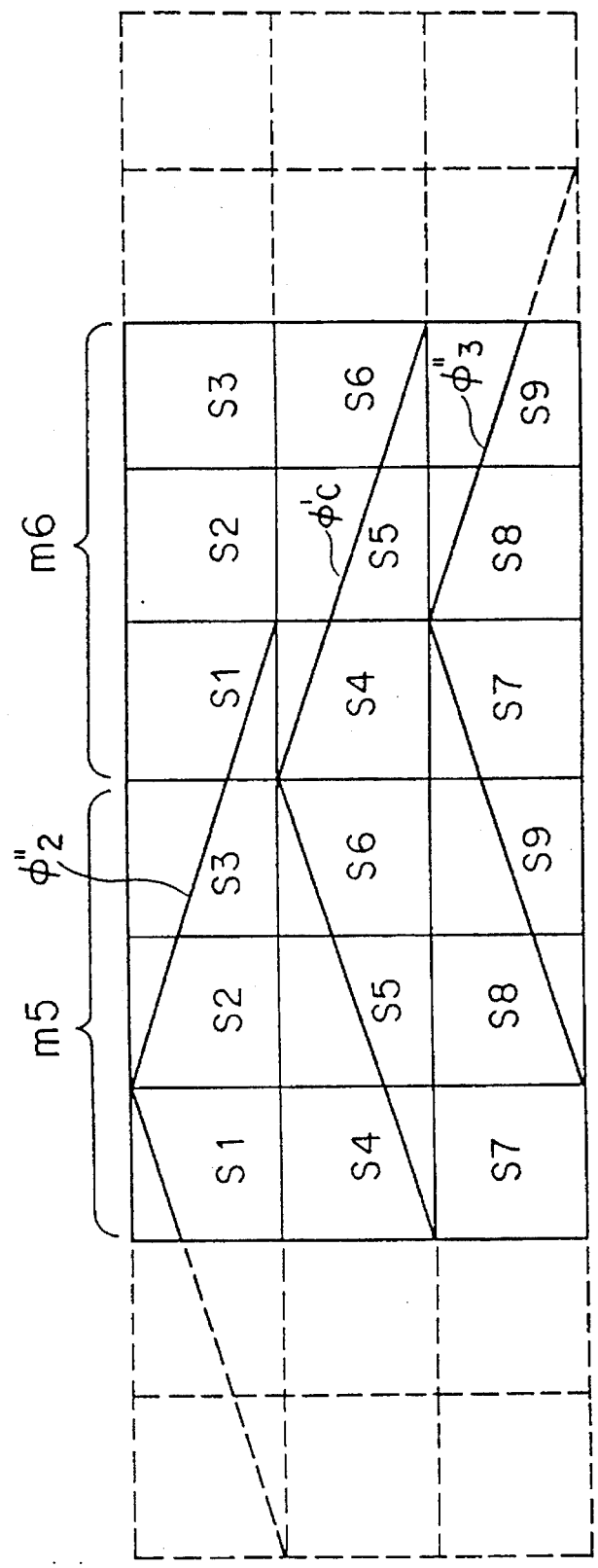
FIG. 11 is a view for explaining phase deviation of the reference wave in the case where the objective pixel exists in a halftone region.

Next, an example in which density distribution in two pixels is found, is shown in FIG. 11. The density data of the obtained small pixel is divided into a small scanning line including s1, s2, s3 . . . , in m5 and m6 in FIG. 5, the small scanning line including s4, s5, s6, and the small scanning line including s7, s8, and s9, and three small scanning lines of the small pixels correspond to one scanning line in every two original pixels.

The arithmetic processing circuit 241 calculates average density of each small scanning line and the position of the gravity center of the density data in the original one pixel including each small scanning line, and outputs the average density data to emission output terminals of laser drivers 301A to 301C, and outputs the selection signals which are different each other as follows and selected from the position data of the gravity center, to selection circuits 250A to 250C from the output terminals OA to OC. That is, the arithmetic processing circuit 241 outputs the following signals from the output terminal OA to the selection circuit 250A: a signal which selects the reference triangular wave $\phi_0''$ whose phase is not shifted when the gravity center of s1, s2, and s3 (the first small scanning line) of the pixel m6 adjoining the pixel m5 is positioned in the vicinity of the center between s3 of m5 and s1 of m6; a signal which selects the triangular wave whose phase is advanced by a ⅙ period when the gravity center is positioned in the vicinity of the border between s2 and s1 of m6; the signal which selects the triangular wave $\phi_2''$ whose phase is advanced by a ⅖ period when the gravity center is positioned in the vicinity of the border between s2 and s3 of m6; the signal which selects the triangular wave $\phi_3''$ whose phase is delayed by a ⅙ period when the gravity center is positioned in the vicinity of the border between s2 and s3 of m5; and the signal which selects the triangular wave $\phi_4''$ whose phase is delayed by a ⅖ period when the gravity center is positioned in the vicinity of the border between s1 and s2 of m5. In the same manner, from the output terminal OB, the triangular wave selection signal of the second small scanning line which is determined by the gravity center of density of s4, s5, and s6 of the pixels m5 and m6, is outputted to the selection circuit 250B, and from the output terminal OC, the triangular wave selection signal of the third small scanning line which is determined by the gravity center of density of s7, s8, and s9 of the pixels m5 and m6, is outputted to the selection circuit 250C. FIG. 11 is an illustration showing an example of the relation between the triangular waves whose phases are different each other, and the objective pixel.

Further, the arithmetic processing circuit 241 controls the emission output of laser drivers 301A to 301C corresponding to the average density in pixels m5 and m6 of each small scanning line. For example, the circuit 241 controls the semiconductor laser 301A to emit the laser beam in proportion to the average density of s1, s2, and s3 between two pixels. FIG. 17 is a graph showing an example of the relation between a driving current of a semiconductor laser and an output of the laser emission.

The image discrimination circuit 231 discriminates the image data of the objective pixel as to which region of the first or the second threshold value the image data belongs to. After that, when the image data of the objective pixel is discriminated to be out of the region of the first and second threshold values, the circuit 231 sends out the selection signal which does not output the triangular wave which is selected by the phase of reference wave determination circuit 240 with respect to the entire color components, but outputs only the reference triangular waves $\phi_0'$ and $\phi_0''$, to the selection circuits 250A to 250C, and does not operate the MTF correction circuit 232. Due to the aforementioned operations, the image density data except the data read out from the read-out circuit 220, is not corrected by the MTF correction circuit 232, but is corrected by the γ correction circuit 233, and after that the image density data is sent out through the latch circuit 230 to the modulation circuits 260A to 260C.

Due to the aforementioned, in the highlight and high density regions, an image which has high uniformity and no noise can be formed.

Further, the image discrimination circuit 231 discriminates to which of the character/halftone/dot regions the image belongs, and after that, when the image is discriminated to belong to the character region or the dot region, the circuit 231 operates the phase of reference wave determination circuit 240, and does not operates the MTF correction circuit 232, and sends the image data to the modulation circuits 260A to 260C through the latch circuit 230 under the condition that the image data is not processed. When the image is discriminated to belong to the halftone region, the circuit 231 does not conduct the triangular wave selection by the phase of reference wave determination circuit 240, but conducts the modulation using only the reference triangular wave $\phi_0$, and the image data read out from the read-out circuit 220 is corrected by the MTF correction circuit 232, and after that, the image data is sent out to the modulation circuits 260A to 260C through the latch circuit 230.

That is, the image discrimination circuit 231 further discriminates generally, under the aforementioned conditions, which of the character region and halftone region the image belongs to. The discrimination is conducted by the density change in 5×5 pixels including the objective pixel of one pixel or in 16×16 pixels including the objective pixel of two pixels. When the density change of the region is large, the discrimination circuit discriminates that the objective pixel belongs to the character region, and when the density change of the region is small, the circuit 231 discriminates that the objective pixel belongs to the halftone region. Further, when the result of the discriminated region is different only in a minute region, for example, when the halftone region exists, being isolated, in the character region, the halftone region is discriminated as the character region. In the case of the halftone region, the image is discriminated in the same manner. When the character and line are discriminated to belong to the character region, the discrimination circuit 231 selects a reference wave from the reference waves $\phi_0'$ to $\phi_4'$ and outputs the selection signal which outputs the triangular wave selected by the phase of reference wave determination circuit 240 with respect to the entire color components to the modulation circuits 260A to 260C, to the selection circuits 250A to 250C, and does not operate the MTF correction circuit 232 and the $\gamma$ correction circuit 233, and sends out the image density data, while it is not processed, through the latch circuit 230 to modulation circuits 260A to 260C. Due to the aforementioned, a sharp character or edge portion whose color is not changed, can be reproduced.

When the image discrimination circuit discriminates that the image belongs to the halftone region, the circuit 231 outputs the selection signal, which is the same as that in the case of the character region, with respect to only the data of an achromatic color component, that is, black, and sends out the selection signal which does not output the triangular wave selected by the phase of reference determination circuit with respect to other color components, but outputs only the reference triangular wave $\phi_0$, to the selection circuits 250A to 250C, and operates the MTF correction circuit 232 and the $\gamma$ correction circuit 233. Due to the aforementioned, the image density data except black, which is read out from the read-out circuit 220, is corrected by the MTF correction circuit 232 and the $\gamma$ correction circuit 233, and after that, the image density data is sent out through the latch circuit 230 to the modulation circuits 260A to 260C.

Due to the foregoing, an image which has no moire or color missing, can be formed in the halftone region, and on the other hand, the image provided with sharpness and tightness can be generated by the black image.

Further, due to the foregoing, the following effects can be provided in the halftone region: an image with high gradation can be formed; and sharpness and tightness can be given to the character image.

Density data of a specific color which is used for determination of phase of the reference wave is converted into the density data of R+2G+B, for example, (in this case, R is a density data of red, G is that of green, and B is that of blue). For convenience sake, the density data of (R+2G+B) will be expressed by N, hereinafter.

When the phase of the reference wave is used in common with respect to each recording color, gradation of an image can be assured, and color change can be prevented. For determination of the phase of the reference wave, a G component which visually coincides with the image density data, or achromatic data having the G component is preferably used.

Data which is used for the image discrimination circuit 231 is data which is common to each color, from the same reason as the foregoing.

The modulation circuits 260A to 260C operate in the following manner: the signal of the image density data inputted through the latch circuit 230 is modulated by the triangular wave which is the selected reference wave; after that, the modulation signal which is pulse-width-modulated by the circuit is generated; and the circuit sends out the modulation signal to the raster scanning circuit 300 after three small scanning lines (one scanning line in the case of the original image density data) in which these modulated signals are continued in parallel, are made to be one unit.

Next, operation of the modulation signal generator 200 will be explained as follows.

FIGS. 10(a) to (d) are timing charts showing a signal in each position of the modulation signal generator in the case where the signal is recording-position-modulated in the region which is discriminated as the character region. The period of the reference wave is the same as that of the original pixel.

In FIG. 10, (a) shows a portion of the signal in which the image density data read out according to the reference clock $DCK_0$ from the page memory 210 making the index signal a trigger, is converted into an analog value by the D/A converter 261. The higher the level is, the lighter is the density shown, and the lower the level is, the darker is the density shown.

Figure 10A:
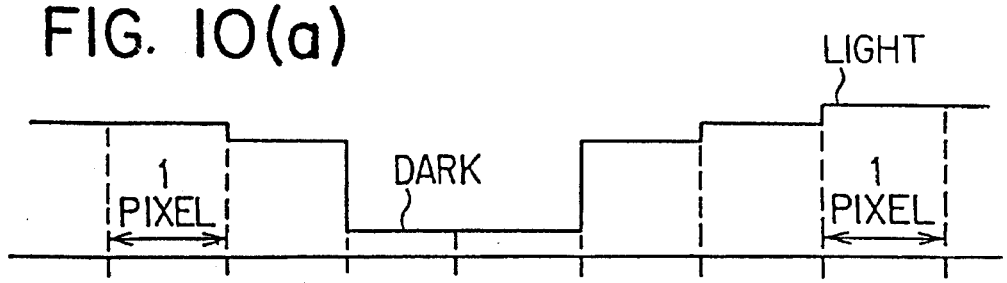
FIGS. 10(a)–10(d) are timing charts showing respective signals in a modulation signal generating circuit of the example in FIG. 1 in the case where the objective pixel exists in the character region.
Figure 10B:
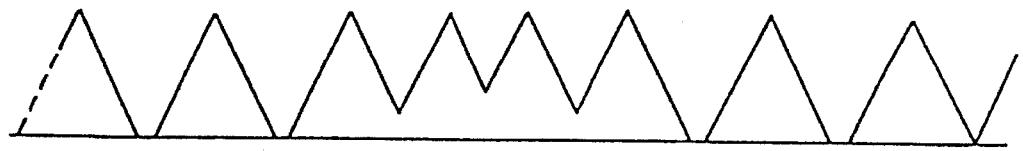

FIG. 10(b) shows the triangular wave which is the reference wave including the reference waves outputted successively from the selection circuit 250 and delayed in the circuit.

Figure 10C:
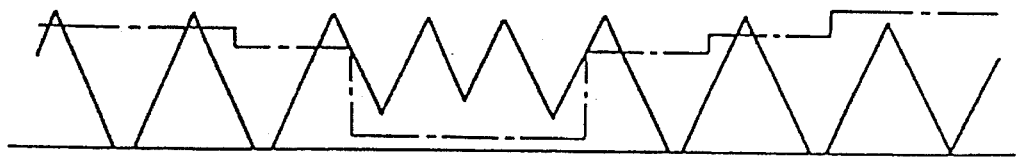

FIG. 10(c) shows the triangular wave (solid line), and the image density signal (one dotted chain line) which is converted into the analog value, and shows the modulation operations in the modulation circuits 260A to 260C.

Figure 10D:

FIG. 10(d) shows the pulse width modulation signal which is generated after the signal has been compared by the comparator 262.

As a result of generation of the modulation signal, the recording position modulation is not conducted in the case of the pixel in the low density portion, or the high density portion, and in a region in which a great density change is brought about, the recording position modulation by which the position of small dots of n lines in the objective pixel is moved to the position along the original character and in the direction of lines of the line image, is conducted according to the density data of the original adjoining pixel, so that the character and the line image can be reproduced sharply.

From the aforementioned result of generation of the modulation signal, the following effects can be found: while in the edge portion in which density changes sharply, the image belongs to the halftone region in the case of the modulation according to the conventional triangular wave whose phase is not changed, however, according to the present invention, the edge portion is emphasized and the character or the line image can be sharply reproduced.

Further, the phase of the triangular wave is shifted according to only the data which is obtained by RE processing of N component which is the specific color, and each color image data is modulated by making the triangular wave the reference wave, and therefore color change of the recording image can be prevented. The specific color N=R+2G+B can be replaced by data of green (G) alone.

In the recording position modulation, only the black component is modulated in the halftone region in order to prevent the image color from changing, and for other color components, modulation by the triangular wave whose phase is not shifted, is conducted.

FIGS. 12(a) to (d) are timing charts showing the signal of each portion in the modulation signal generator in the case where the signal is recording-position-modulated in the region which is discriminated as the halftone region. As shown in FIG. 11, the period of the reference wave is twice the period of the original pixel.

Figure 12:
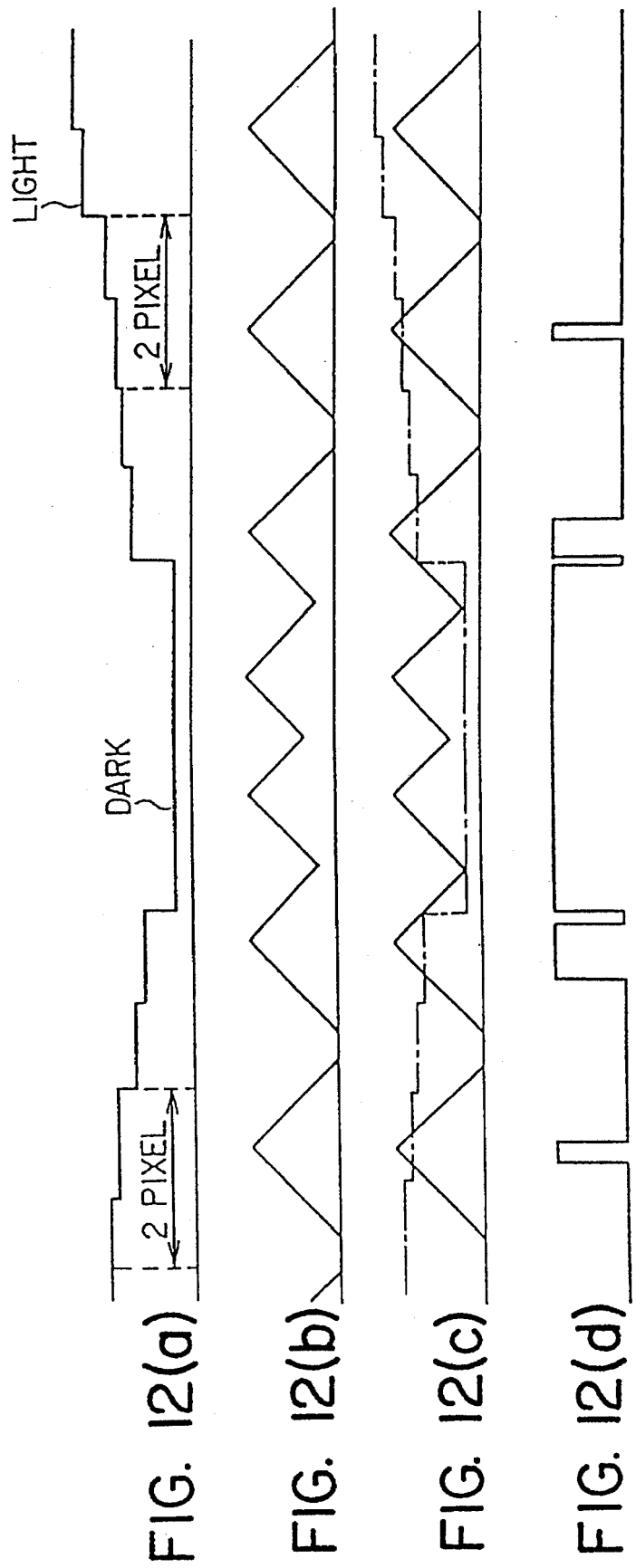

In FIG. 12, (a) shows a portion of the signal in which the image density data read out from the page memory 210 according to the reference clock $DCK_0$ by making the index signal a trigger, is converted into an analog value by the D/A converter 261. The higher the level is, the lighter is the density shown, and the lower the level is, the darker is the density shown. The image data has the image density in which data of two pixels are averaged in the primary scanning direction.

FIG. 12(b) shows the triangular wave which is the reference wave outputted successively from the selection circuit 250 and including the reference wave which is delayed in the circuit.

FIG. 12(c) shows the triangular wave (solid line), and the image density signal (one dotted chain line) which is converted into the analog value, and shows the modulation operations in the modulation circuits 260A to 260C.

FIG. 12(d) shows the pulse width modulation signal which is generated after the signal has been compared by the comparator 262.

As a result of generation of the modulation signal, the recording position modulation is not conducted in the case of the pixel positioned in the low density portion, or the high density portion, and in a region in which a great density change is brought out, the recording position modulation by which the position of small dots of n lines in the objective pixel is moved to the position in the direction in which a great density change is brought out, is conducted according to the density data of the original adjoining pixel, so that even the image in the halftone region in photography and the like can be reproduced sharply.

Further, when a phase of the reference wave is shifted in the subsidiary scanning direction successively, a dot corresponding to a halftone dot having a screen angle can be structured. For example, when the screen angle is 45° for a yellow component, 26.6° for a magenta component, −26.6° for a cyan component, and 0° for a black component, uniformity of the color reproduction can be improved, and generation of moire fringes can be prevented.

Especially, when the screen angle for the black component is 0°, the recording position modulation means can be used without any alteration.

The raster scanning circuit 300 is provided with a δ delay circuit 311, a 2δ delay circuit 312, laser drivers 301A to 301C, an index detection circuit which is not shown in the drawings, a polygonal mirror driver, and the like.

Laser drivers 301A to 301C oscillate a semiconductor laser array 431 having a plurality of (in this case, three) laser emission sections 431A to 431C by the modulation signal from the modulation circuits 260A to 260C, and a signal corresponding to an amount of light beams from the semiconductor laser array 431, is fed back, and the laser drivers 301A to 301C drive the semiconductor laser array 431 so that the light amount can be kept constant.

The index detection circuit detects the surface position of the rotating polygonal mirror 434 which is rotated at a predetermined speed by an index signal outputted from an index sensor 439, and conducts optical scanning by the image density signal modulated by the raster scanning method according to the period in the primary scanning direction. The scanning frequency is 2204.72 Hz, the effective printing width is not less than 297 mm, and the effective exposing width is not less than 306 mm.

The polygonal mirror driver rotates a D.C. motor at a predetermined speed uniformly, and a rotary polygonal mirror at 16535.4 rpm.

Figure 15:
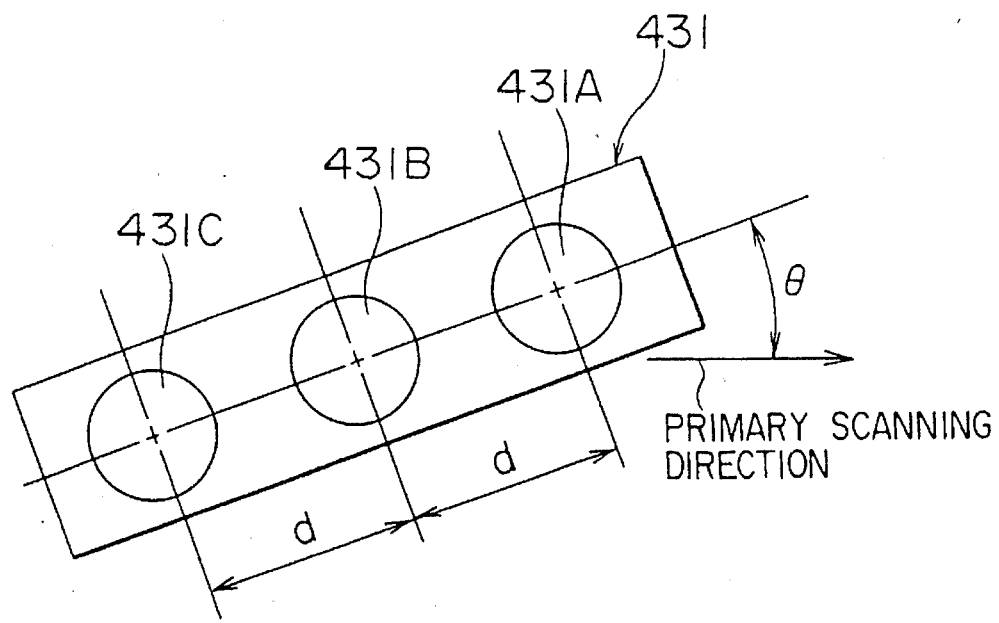
FIG. 15 is a view showing a semiconductor laser array of the example in FIG. 4.
Figure 16:
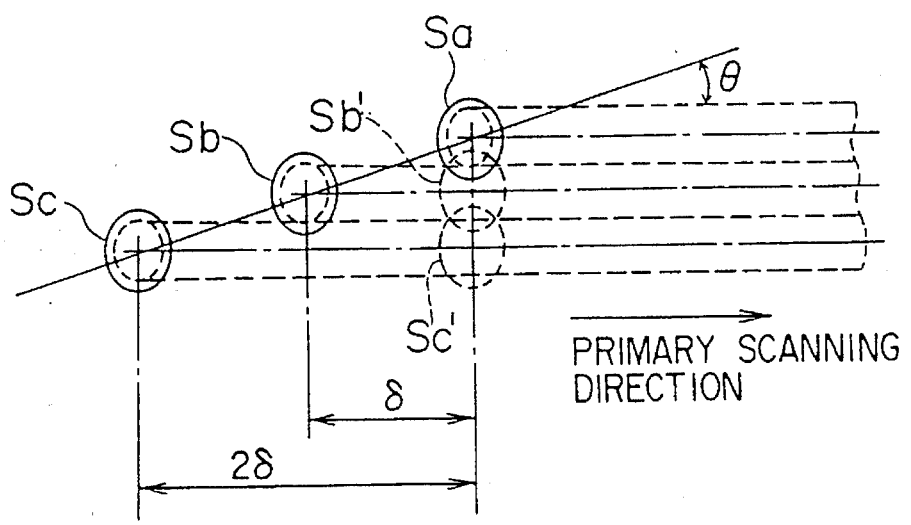
FIG. 16 is a view showing a scanning locus of laser spots using the semiconductor laser array in FIG. 13.

As shown in FIG. 15, the semiconductor laser array 431 is used in the manner that three emitting portions 431A to 431C are arrayed at regular intervals. Since it is normally difficult that a space d between emitting portions is not more than 20 μm, a shaft which passes through the center of emitting portions 431A to 431C is mounted to be parallel with the rotating shaft of the rotary polygonal mirror 434, and to be inclined at a predetermined angle with respect to the primary scanning direction, as shown in FIG. 15. Due to the aforementioned, laser spots sa, sb, sc of the laser beam by the semiconductor laser array 431 on the photoreceptor 401 can scan upwardly and downwardly in the manner that they are close to each other, as shown in FIG. 16. However, due to the aforementioned, positions of laser spots sa, sb, and sc in the scanning direction are deviated respectively with respect to the primary scanning direction. In order to correct the deviation, when the δ delay circuit 311 is inserted between the modulation circuit 260B and the laser driver 301B, and the 2δ delay circuit 312 is inserted between the modulation circuit 260C and the laser driver 301C so that an appropriate amount of time is delayed and the timing is adjusted, laser spots sa, sb, and sc emitted from the semiconductor laser array 431 are replaced by sa, sb' and sc' which are vertically arranged with respect to the primary scanning direction so that sa, sb' and sc' can be recorded.

When the RE processing is conducted in the manner that the objective pixel is divided into 2×2 small pixels, the semiconductor laser array having two emitting portions is used.

Figure 20:
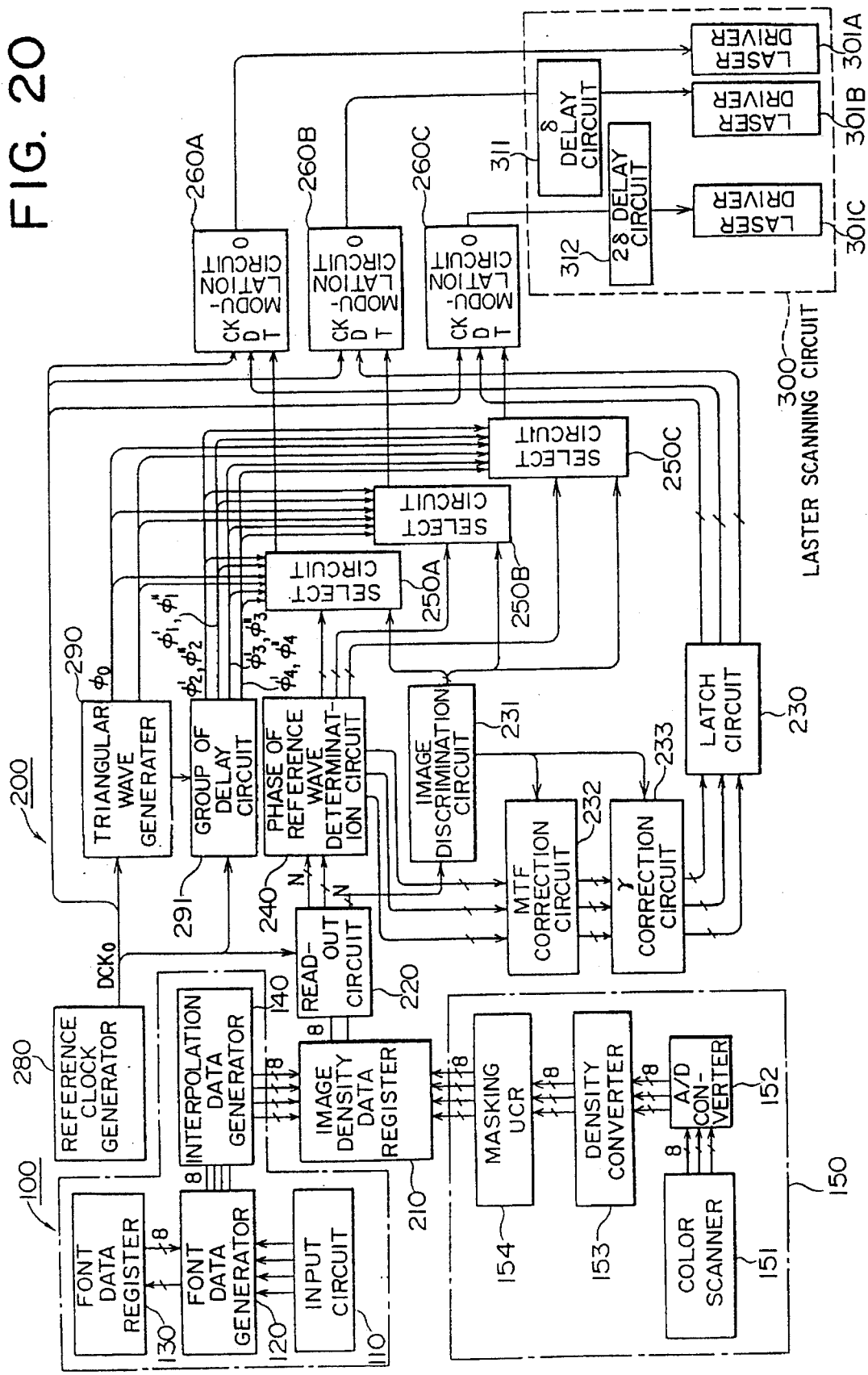
FIG. 20 is a block diagram showing an image processing circuit of another example of the present invention.
Figure 21:
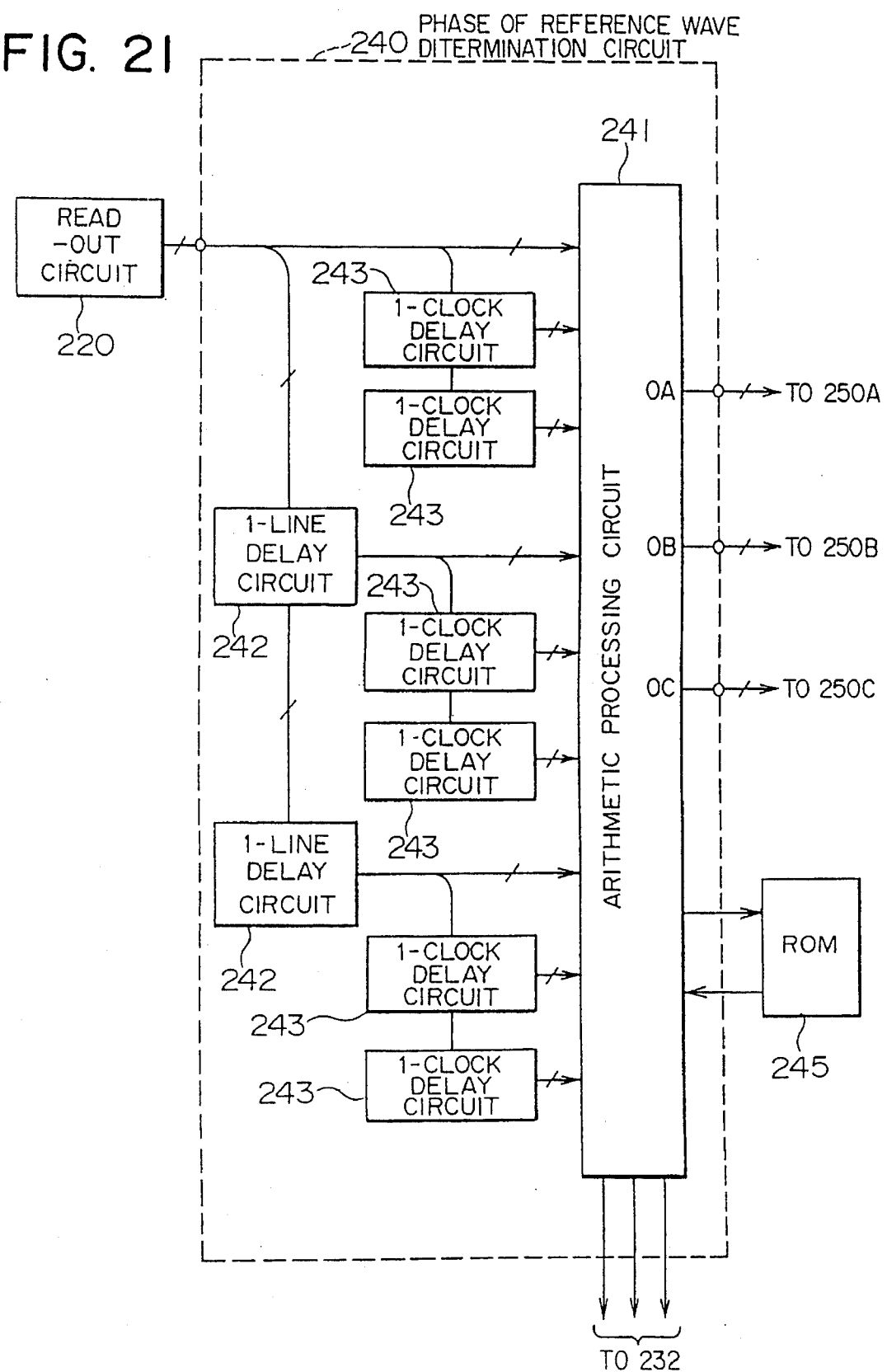
FIG. 21 is a block diagram showing a phase of the reference wave determination circuit in FIG. 20.

In the aforementioned embodiments of the present invention, as for the density information in each scanning direction, the average density in the primary scanning direction is regarded as the laser emitting output, and the data outputted from the read-out circuit 220 is used for the image data. However, the following structure can be adopted in which: the average density of each small scanning line obtained by the phase of the reference wave determination circuit 240, as shown in FIG. 20 and FIG. 21, is used for the density information; and the density data is inputted into the modulation circuits 260A to 260C by each reference wave so that laser drivers 301A to 301C are modulated.

Next, the image forming process of the image forming apparatus 400 shown in FIG. 4, will be explained as follows.

At first, the photoreceptor 401 is charged uniformly by the scorotron charger 402. An electrostatic latent image corresponding to yellow is formed on the drum-like photoreceptor 401 by the following method: the laser beam modulated by yellow data (8 bit digital density data) read out from the image density data register 210 is emitted through the cylindrical lens 433 and the rotary polygonal mirror 434, the fθ lens 435, the cylindrical lens 436, and the reflection mirror 437. The electrostatic latent image corresponding to yellow is developed by the first developing unit 441, and an extremely sharp dot-like first toner image (yellow toner image) is formed on the photoreceptor 401. The first toner image is not transferred onto a recording sheet, passes under the cleaning device 470 which is withdrawn, and the scorotron charger 402 charges again the surface of the photoreceptor 401.

Next, the electrostatic latent image is formed after the laser beam modulated by magenta data (8 bit digital density data) has been radiated on the photoreceptor 401. The latent image is developed by the second developing unit 442 so that the second toner image (magenta toner image) is formed. In the same way as the above described, the electrostatic latent image by the cyan data is developed by the third developing unit 443 so that the third toner image (cyan toner image) is formed, and a three color toner image, in which three images of different colors are superimposed successively, is formed on the photoreceptor 401. Lastly, the fourth toner image (black toner image) is formed, and a four color toner image, in which four images of different colors are superimposed successively, is formed on the photoreceptor 401.

According to the image forming apparatus 400 of the present embodiment, the photoreceptor 401 has excellent high γ characteristics, and even when the toner image is formed in the manner that a plural number of times of charging and exposing processes are conducted repeatedly so that toner images are superimposed, the latent image can be formed stably due to the excellent high γ characteristics. That is, even when the laser beam is radiated on toner images according to the digital signal, a dot-like electrostatic latent image which has no fringe and high sharpness, is formed, and thereby a toner image having high sharpness can be obtained.

These four color toner images are transferred onto a recording sheet fed from a sheet feed device by the transfer unit 462.

The recording sheet on which the transferred toner image is carried, is separated from the photoreceptor 401 by a separator 463, conveyed to a fixing roller 464 by a guide and a conveyance belt, thermally fixed and delivered to a sheet delivery tray.

In the present embodiment, as the result of experimenting in which values of factor P for RE processing were changed variously, a fine image could be obtained in the range of 0.1 to 0.9 of P. However, since sharpness of characters is insufficient when P is small, and an edge portion of a line image or a dot is too emphasized when P is large, it was found that the preferable range of P is 0.3 to 0.7. Due to this, when an original document was written by characters or line images, the edge portion could be formed clearly, so that, even in the case of small characters, detail could be reproduced. Further, bad effects did not occur in the low density portion or high density portion. This is due to the reason that this method stops the recording position modulation with respect to these pixels, and makes the factor P=0.

Further, bad effects did not occur also in the case of the halftone image in photography. This is due to the reason that the P value has little effect on the halftone image.

Although, in this method, P can be used as a constant, it is preferable that P is changed in synchronization with the recording period, that is, corresponding to the image (in a character region or halftone region). When the P value is defined as $P_1$ in the case where the recording period is short, that is, the image is in the character region, and the P value is defined as $P_2$ in the case where the recording period is long, that is, the image is in the halftone region, $$P_1 > P_2$$

is preferable. That is, when the image exists in the character region, the P value is large, preferably 0.9 to 0.4, and when the image exists in the halftone region, the P value is small, preferably 0.6 to 0.1.

P=0 corresponds to the value in the case where recording position modulation is not conducted.

Further, in the present invention, the ratio of RE processing can be changed.

Figure 18:
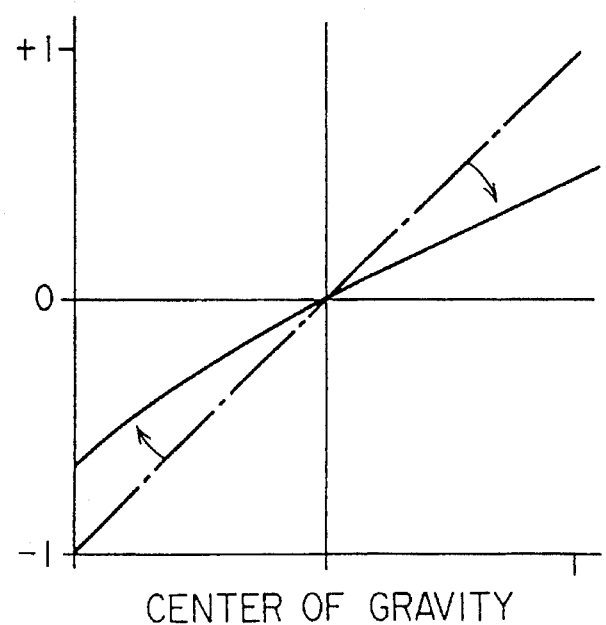
FIG. 18 is a graph showing an example in the case where the relation between the center of gravity in the primary scanning direction and a recording position of a small scanning line, is changed.
Figure 19:
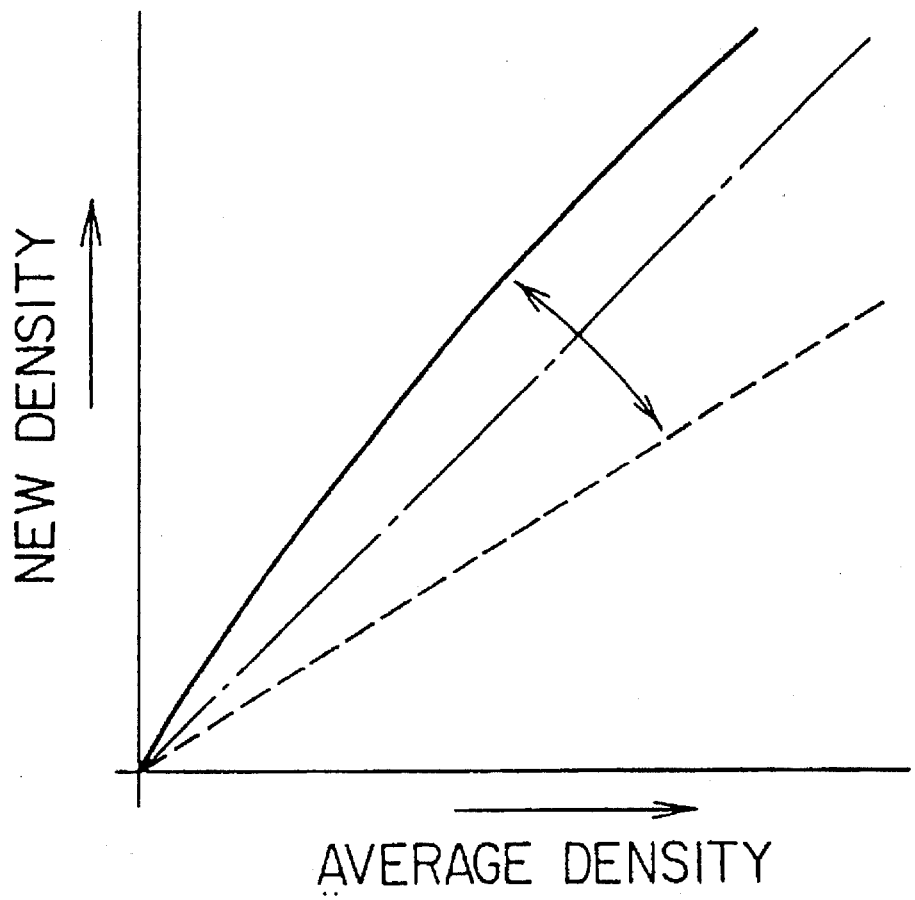
FIG. 19 is a graph showing the case where average density of the small scanning line in the subsidiary scanning direction is changed.

FIG. 18 is a graph showing an example of the case where the relation between the recording position in the primary scanning direction and the gravity center is converted. FIG. 19 is a graph showing an example of the case where the average density in the subsidiary scanning direction is converted.

In the arithmetic processing circuit 241, the recording position can be changed according to a conversion equation which is set beforehand, for example, as shown in FIG. 18 using a ROM 245 in which the result obtained from the image density data by arithmetic processing is contained, or on which the above result is provided externally. Similarly, average density in the subsidiary scanning direction can be changed also as shown in FIG. 19.

Especially, it is preferable that the ratio of conversion shown in FIG. 18, and FIG. 19 is changed corresponding to the case where the period of the reference wave is changed. When the period of the reference wave is large, it is preferable that gradation is seriously considered, and the ratio of the recording position modulation is decreased, or γ of gradation is decreased.

In the aforementioned flow of the image data, an example of a laser printer which outputs the data having been stored once in the page memory 210 is explained. However, the present invention is not limited to the specific embodiments, but when the image data processing circuit 100 is replaced by the image data processing circuit 150 composed of the color scanner 151, the A/D converter 152, the density converter 153, the masking UCR circuit 154 and the like, and the image density data is inputted into the processing circuit 150 from the scanner and the image is processed in the circuit, the present invention can be adopted to other image forming apparatus such as a copying apparatus and the like.

When the image forming apparatus of the present invention is used as a copying apparatus, the image density data register 210 can be neglected so that real time output can be conducted. In this case, when the method by which the color image formation is conducted is adopted, a selector is provided between the masking UCR circuit 154 and the read-out circuit 220, and the selector outputs the recording color of the printer and the image density data N of the specific color for the recording position determination.

The image density data N of the specific color may be generated by the density conversion circuit 153 provided in the former stage, instead of the masking UCR circuit 154. Due to the foregoing, processing in the phase of reference wave determination circuit 240 or the image discrimination circuit 231, and processing in the masking UCR circuit 154 can be conducted in parallel, and thereby, delay in each processing can be prevented and high speed processing can be conducted.

Further, although the period of the reference wave is changed at each pixel corresponding to the result of image discrimination, the entire image plane can be changed uniformly by an external command such as a character mode, a photographic mode, and the like.

As described above, the phase of the reference wave is selected from the image data of the specific color including green in which RE processing which divides the objective pixel into small pixels and distributes the density of the objective pixel corresponding to the distribution of the density data of the adjoining pixel including the objective pixel, is conducted with regard to density of each small pixel, the density signal of each color of the objective pixel is modulated by the reference wave so that the modulation signal is generated, and color image recording is conducted by the modulation signal, and thereby, an excellent color image forming apparatus in which the color of the image generated by a scanner, CG, or font data can not be changed, and sharpness of the image can be improved, can be provided.

An excellent recording image is obtained by the following methods: the objective pixel is divided into small pixels corresponding to density data of the objective pixel with respect to the objective pixel which is included in the specific density; the phase of the reference signal is selected from the image data on which RE processing which distributes density of the objective pixel according to the distribution of the density data of the adjoining pixel including the objective pixel is conducted concerning density of each pixel; the recording position modulation signal in which the density signal of the objective pixel is modulated by the reference signal, is generated; and the recording position modulation is not conducted on the low density portion and the high density portion. Further, color image recording is conducted by the following methods: image discrimination is conducted by the image discrimination circuit; and the recording position modulation is conducted by the reference wave whose time period is short when the image belongs to the character region, and the recording position modulation is conducted by the reference wave whose time period is long when the image belongs to the halftone region, so that an excellent color image forming apparatus can be provided.

Although the foregoing example shows the case where the number of recording beams of the pixel is three, it can be conducted that one pixel is scanned by one or two recording beams, and recording position modulation is conducted only in the primary scanning direction. When the high γ photoreceptor is used, the aforementioned effects can be further increased.

What is claimed is:

1. An apparatus for forming a color image in a form of pixels, the apparatus comprising:

a memory for storing density signals of pixels, wherein each pixel has a plurality of color component signals each representing a density level of a corresponding color component;

a photoreceptor on which each pixel is provided with an imaging area;

image forming means including an exposure element for forming a dot-shaped latent image for each color component signal in the imaging area of each pixel;

means for reading Y(yellow), M(magenta), C(cyan), and BK(black) color component signals of each pixel from the memory;

pulse generating means for generating a driving pulse with a given timing to drive the exposure element for each color component signal, the pulse generating means regulating the driving pulse in accordance with the density level of each of the Y,M,C,BK color component signals so that a size of the dot-shaped latent image of each color component signal is changed in accordance with the density level thereof, the pulse generating means including signal processing means for processing density signals of pixels neighboring a target pixel and for changing a given timing of the driving pulse so that the signal processing means conducts a recording position modulation so as to shift a recording position of a dot image of the target pixel in the imaging area of the target pixel in accordance with the density levels of the neighboring pixels;

control means for controlling the pulse generating means such that when the pulse generating means generates a driving pulse for the BK color component signal the signal processing means conducts the recording position modulation to shift a dot image of the BK color component signal in the imaging area of the target pixel, and when the pulse generating means generates a driving pulse for each of the Y,M,C color component signals, the signal processing means does not conduct the recording position modulation so that a dot image of each of the Y,M,C color component signals is not shifted in the imaging area of the target pixel; and driving means for driving the exposure element in response to the driving pulse for each of the Y,M,C,BK color component signals.

2. The apparatus of claim 1 further comprising image discriminating means for determining from the Y,M,C,BK color component signals whether or not an image is a halftone image.

3. The apparatus of claim 2, wherein, when the image discriminating means determines that the image is a halftone image the control means controls the signal processing means so as to conduct the recording position modulation for the BK color component signal and not to conduct the recording position modulation for each of the Y,M,C color component signals, and when the image discriminating means determines that the image is not a halftone image the control means controls the signal processing means so as to conduct the recording position modulation for each of the Y,M,C,BK color component signals.

4. An apparatus for forming a color image in a form of pixels, the apparatus comprising:

a memory for storing density signals of pixels, wherein each pixel has a plurality color component signals each representing a density level of a corresponding color component;

a photoreceptor on which each pixel is provided with an imaging area;

image forming means including an exposure element for forming a dot-shaped latent image for each color component signal in the imaging area of each pixel;

means for reading Y(yellow), M(magenta), C(cyan), and BK(black) color component signals of each pixel from the memory;

pulse generating means for generating a driving pulse with a given timing to drive the exposure element for each color component signal, the pulse generating means regulating the driving pulse in accordance with the density level of each of the Y,M,C,BK color component signals so that a size of the dot-shaped latent image of each color component signal is changed in accordance with the density level thereof;

the pulse generating means including signal processing means for processing density signals of pixels neighboring a target pixel and for changing a given timing of the driving pulse so that the signal processing means conducts a recording position modulation so as to shift a recording position of a dot image of the target pixel in the imaging area of the target pixel in accordance with the density levels of the neighboring pixels;

control means for controlling the pulse generating means such that when the pulse generating means generates a driving pulse for each of the Y,M,C color component signals the signal processing means conducts the recording position modulation so as to shift a dot image of each of the Y,M,C color component signals to the same recording position in the imaging area of the target pixel; and driving means for driving the exposure element in response to the driving pulse for each of the Y,M,C,BK color component signals.

5. The apparatus of claim 4, wherein, when the pulse generating means generates a driving pulse for each of the Y,M,C,BK color component signals the signal processing means conducts the recording position modulation to shift a dot image of each of the Y,M,C,BK color component signals in the imaging area of the target pixel.

6. The apparatus of claim 4, further comprising image discriminating means for determining from the Y,M,C,BK color component signals whether or not an image is a letter image.

7. The apparatus of claim 6, wherein, when the image discriminating means determines that the image is the letter image the control means controls the signal processing means so as to conduct the recording position modulation for the Y,M,C,BK color component signals, and when the image discriminating means determines that the image is not the letter image the control means controls the signal processing means so as to conduct the recording position modulation for the BK color component signal.

* * * * *